(12) United States Patent
Hashimoto et al.

(10) Patent No.: US 8,281,076 B2
(45) Date of Patent: Oct. 2, 2012

(54) STORAGE SYSTEM FOR CONTROLLING DISK CACHE

(75) Inventors: Akiyoshi Hashimoto, Kawasaki (JP); Aki Tomita, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/833,442

(22) Filed: Jul. 9, 2010

(65) Prior Publication Data
US 2010/0274964 A1    Oct. 28, 2010

Related U.S. Application Data

(63) Continuation of application No. 11/251,213, filed on Oct. 17, 2005, now Pat. No. 7,769,952.

(30) Foreign Application Priority Data

Aug. 4, 2005  (JP) .................................. 2005-226418

(51) Int. Cl.
G06F 12/00 (2006.01)
G06F 13/00 (2006.01)
G06F 13/28 (2006.01)

(52) U.S. Cl. ................. 711/129; 711/130; 711/E12.038
(58) Field of Classification Search ........................ None
See application file for complete search history.

(56) References Cited

U.S. PATENT DOCUMENTS

| 4,425,615 | A | * | 1/1984 | Swenson et al. | 711/114 |
|---|---|---|---|---|---|
| 4,442,487 | A | * | 4/1984 | Fletcher et al. | 711/122 |
| 5,434,992 | A | * | 7/1995 | Mattson | 711/119 |
| 5,469,548 | A | * | 11/1995 | Callison et al. | 711/114 |
| 5,542,066 | A | * | 7/1996 | Mattson et al. | 711/136 |
| 5,701,503 | A | * | 12/1997 | Singh et al. | 711/126 |
| 5,717,893 | A | * | 2/1998 | Mattson | 711/129 |
| 6,161,208 | A | * | 12/2000 | Dutton et al. | 714/764 |
| 6,341,331 | B1 | * | 1/2002 | McNutt | 711/113 |
| 6,510,496 | B1 | * | 1/2003 | Tarui et al. | 711/147 |
| 6,615,322 | B2 | * | 9/2003 | Arimilli et al. | 711/145 |
| 6,728,836 | B1 | | 4/2004 | Lambright et al. | |
| 7,249,221 | B2 | * | 7/2007 | Shimada | 711/130 |
| 7,624,235 | B2 | * | 11/2009 | Wadhawan et al. | 711/129 |
| 7,627,617 | B2 | * | 12/2009 | Kavuri et al. | 1/1 |
| 2003/0079087 | A1 | | 4/2003 | Kuwata | |
| 2003/0191910 | A1 | * | 10/2003 | Matsunami et al. | 711/154 |
| 2003/0212855 | A1 | * | 11/2003 | Sakaguchi et al. | 711/113 |

(Continued)

FOREIGN PATENT DOCUMENTS

EP            1 548 561            6/2005

(Continued)

*Primary Examiner* — Edward Dudek, Jr.
*Assistant Examiner* — Matthew Chrzanowski
(74) *Attorney, Agent, or Firm* — Hitachi America, Ltd.

(57) ABSTRACT

A storage system coupled to a host computer, including: a non-volatile medium that stores data; a disk cache that temporarily stores data stored in the non-volatile medium, where the disk cache is divided into a plurality of independent disk cache partitions; a control unit that controls an input and an output of data to and from the non-volatile medium; and a memory unit that stores information used by the control unit, including consistency control information setting respective commands permitted for each of the disk cache partitions, to guarantee consistency of the data; wherein the control unit is configured to determine whether or not to execute a requested command for a given disk cache partition, by referring to the consistency control information setting respective commands permitted for each of the disk cache partitions.

20 Claims, 19 Drawing Sheets

U.S. PATENT DOCUMENTS

| | | |
|---|---|---|
| 2004/0039880 A1* | 2/2004 | Pentkovski et al. ............ 711/146 |
| 2004/0049636 A1* | 3/2004 | Campbell et al. ............. 711/130 |
| 2004/0078518 A1* | 4/2004 | Kuwata ........................ 711/113 |
| 2004/0123068 A1 | 6/2004 | Hashimoto |
| 2004/0205295 A1* | 10/2004 | O'Connor et al. ............ 711/129 |
| 2005/0223188 A1* | 10/2005 | Moll et al. .................... 711/202 |
| 2006/0080398 A1* | 4/2006 | Hoover et al. ................ 709/213 |
| 2006/0117138 A1* | 6/2006 | Suzuki et al. ................. 711/114 |
| 2007/0055826 A1* | 3/2007 | Morton et al. ................ 711/141 |

FOREIGN PATENT DOCUMENTS

| | | |
|---|---|---|
| EP | 1 562 123 | 8/2005 |
| JP | 08-147218 | 6/1996 |
| JP | 2003-131946 | 5/2003 |
| JP | 2004-139349 | 5/2004 |
| JP | 2004-199420 | 7/2004 |

* cited by examiner

| ENTRY NUMBER 200 | TRACK NUMBER 201 | SEGMENT NUMBER 202 | SHARING PARTITIONS NUMBER 203 | STATE 204 | |
|---|---|---|---|---|---|
| 0x00000000 | 0x00001000_1234568 | 0xf8003210 | 1 | DIRTY | ←205 |
| 0x00000001 | 0x00000020_fedcba98 | 0x0200d3f0 | 3 | CLEAN | ←206 |
| ⋮ | ⋮ | ⋮ | ⋮ | | |

DISK CACHE CONTROL TABLE  111

FIG.2

| PARTITION NUMBER 400 | REQUESTER IDENTIFIER 401 | ALLOCATED CAPACITY 402 | USED CAPACITY 403 | POINTER TO DISK CACHE PARTITION CONTROL INFORMATION 404 |
|---|---|---|---|---|
| 0 | 0 | 1GB | 256MB | 0x3fed0030 |
| 1 | 2 | 4GB | 1GB | 0x4200fde0 |
| ⋮ | ⋮ | ⋮ | ⋮ | ⋮ |

DISK CACHE PARTITION CONTROL TABLE

*FIG.4*

| ENTRY NUMBER 600 | TRACK NUMBER 601 | POINTER TO SHARED STATE INFORMATION 602 |
|---|---|---|
| 0x00000000 | 0x00001000_1234568 | 0xfd003210 |
| 0x00000001 | 0x00000020_fedcba98 | 0xef002340 |
| ⋮ | ⋮ | ⋮ |

SHARED CACHE CONTROL TABLE  115

*FIG.6*

| HARD DISK DRIVE NUMBER (1500) | TRACK NUMBER (1501) | PARTITION 0 (1502) | PARTITION 1 (1503) | ••• (1400) |
|---|---|---|---|---|
| 0x00000000 | 0x00000000_00000000 ~ 0x00000000_00001000 | READABLE WRITEABLE | READABLE WRITEABLE | ••• |
| 0x00000001 | 0x00000000_00001000 ~ 0x00000000_00002000 | READABLE WRITEABLE | READABLE | ••• |
| ⋮ | ⋮ | ⋮ | ⋮ | |

HARD DISK DRIVE ATTRIBUTE TABLE

*FIG.15*

THE CASE WHICH THE PARTITIONS HAVE NO SHARED DISKS

THE CASE WHICH THE PARTITIONS HAVE SHARED DISKS

EFFECTIVE DISK CACHE CAPACITY COMPARISON
BETWEEN SHARED DISK AND NO SHARED DISK

STORAGE SYSTEM FOR CONTROLLING DISK CACHE

This is a continuation of U.S. application Ser. No. 11/251,213, filed Oct. 17, 2005, now U.S. Pat. No. 7,769,952. This application relates to and claims priority from Japanese Patent Application No. 2005-226418, filed on Aug. 4, 2005. The entirety of the contents and subject matter of all of the above is incorporated herein by reference.

BACKGROUND

This invention relates to a storage device, and more particularly relates to a control technology for a disk cache.

Along with recent progress in semiconductor technology, speed of semiconductor memories has been getting faster. On the other hand, storage systems such as hard disk drives have not increased their speed as much as the semiconductor memories because they have mechanical components such as motor. For example, while an access time (latency) of a typical semiconductor memory is in an order ranging from some ten nanoseconds to some hundreds nanoseconds, a latency of the hard disk drive is some milliseconds. In this way, a large difference exists in latency between the semiconductor memories and the hard disk drives, so the hard disk drives tend to be a bottleneck of computer systems.

To alleviate the difference, a technology has been developed to reduce the latency of the storage system by installing semiconductor memories on the storage system, and storing frequently used data in the semiconductor memories. The semiconductor memories provide a property similar to a cache in a CPU, and are thus referred to as a disk cache.

When data required by a host computer is stored in the disk cache, the host computer can access the data with the latency of the semiconductor memory, and the disk cache has a very large effect on shortening the latency.

When the host computer accesses data in the storage system, and the disk cache holds the data, this state is referred to as cache hit, and when the disk cache does not hold the data, this state is referred to as cache miss. A percentage of the cache hit is referred to as cache hit rate or hit rate. The higher the hit rate is, statistically the shorter the latency of the storage system is, and the more the performance of the storage system increases.

Thus, in order to increase the capability of the storage system, it is necessary to install a large capacity of the disk cache (i.e. semiconductor memories). However, a cost per capacity (referred to as bit cost) of the semiconductor memory is some hundreds times as much as a bit cost of the hard disk drive, and it is impossible to install an unlimited amount of the disk cache (semiconductor memories). In other words, for the disk cache, there is a trade-off relation between the performance and the cost.

Recently many enterprises have been consolidating a plurality of storage systems (hereinafter, sometimes called "plural storage systems") into a single large storage system. This consolidation is referred to as a storage consolidation in enterprise-level computing market. The storage consolidation provides several advantages.

As a first advantage, management tasks can be simplified and unified.

When there are plural storage systems, and these systems consist of many different kinds of storage systems, an operation method varies from one storage system to another, and it is thus necessary to respectively assign independent administrators. The consolidation of the storage systems can reduce the number of administrators to one, resulting in a reduction of a labor cost of the administrators.

Moreover, although a single administrator may manage the different kinds of storage systems, the management tasks become cumbersome, and a burden on the administrator increases. Specifically, Each of the storage systems has a different operation procedure from that of others', thus the administrator has to learn operation procedures corresponding to each storage system. It is a burden to the administrator. The consolidation of the storage systems to a single storage system can simplify the management tasks, resulting in reducing the burden on the administrator.

As a second advantage, the utilization of a storage resource increases.

Generally, an entire capacity is not used in a storage system. When users run out of the entire capacity, the users cannot continue tasks thereof. An administrator always maintains a standby capacity within a storage system to prevent an interruption of tasks. If there are plural storage systems, it is necessary to have a standby capacity for the each storage system.

For example, when a certain storage system has an enough standby capacity, and another storage system is running out of its standby capacity, the administrator cannot move the standby capacity from the first storage system to the second storage system. The administrator has to purchase an additional hard disk drive for the second storage system. In other words, although a standby capacity is available in the plural storage systems as a whole, the standby capacity cannot be utilized effectively.

When the storage systems are consolidated into a single storage system, above-described state does not occur where the standby capacity cannot be used while there is enough standby capacity as a whole. Therefore, the administrator can reduce the standby disk capacity installed on the storage system compared with the case not consolidated. Therefore the users can reduce the cost as a whole. In other words, the storage consolidation brings about an increase in the investment efficiency of the purchased storage resource for the users.

Although the storage consolidation realizes the above advantages for the users, it is necessary to take proper care.

The storage consolidation results in a configuration where plural host computers are connected to a single storage system. As a result, the plural host computers share a disk cache. The host computers are in charge of various tasks, and have various access patterns to the storage system.

For example, there will be considered an example where a certain computer accesses to the storage system more frequently than other host computers. When the disk cache employs an LRU (Least Recently Used) algorithm, which is the most commonly used, the host computer with high access rate uses most of the disk cache capacity, and a capacity of the disk cache available for the other computers becomes extremely small.

This results from the LRU algorithm keeping data accessed recently in the disk cache. This obstructs the other host computers' task.

In view of the foregoing problems, there has been devised a technology which enables an administrator to set capacities of the disk cache available for the respective host computers. This technology is disclosed in JP 1996-147218 A, JP 2000-139349 A, and U.S. Pat. No. 6,728,836. In those patent documents, capacities of a disk cache are allocated to respective host computers. In other words, since a user can designate upper limits of the capacities of the disk cache available for the respective host computers, a single computer will not use most of the disk cache, and the latency of the storage system will not increase for the other host computers.

SUMMARY

According to the technologies described in those patent documents, it is possible to allocate capacities of the disk cache to the respective host computers. Herein, portions of the disk cache allocated to the respective host computer are referred to as disk cache partition.

According to the related art, the each disk cache partition function as an independent disk cache. As a result, data loaded in a certain disk cache partition cannot be referred by host computers using other disk cache partitions.

Therefore the storage system cannot help storing the data to plural disk cache partitions in order for the host computers to refer the data. But the related art does not mention processing therefore. If this process were carried out, the same data would use memory areas in different disk cache partitions, resulting in duplicated caching.

As described above, the disk cache is a critical component on the performance. Further, the bit cost of disk cache is higher than that of a hard disk drive. Therefore, keeping duplicate caching leads to a significant deterioration in those performance.

Moreover, when the administrator wants to maintain uniform performance among host computers, the administrator has to install a disk cache (semiconductor memories) with a larger capacity, resulting in an increase in the cost. This implies a decrease in investment efficiency of the storage system.

Moreover, when data from the hard disk drive cannot be loaded in two different disk cache partitions at the same time, it is necessary to copy contents in the hard disk drive to another hard disk drive. And each of the two hard disk drives corresponds to the two disk cache partitions. This process causes the same data to be stored in different hard disk drives. And the same data will be treated as different data. As a result, the user can store the same data in two different disk cache partitions.

However, the administrator has to install plural hard disk drives with the same contents. The administrator incur additional cost of hard disk drives Therefore it is an object of this invention to eliminate duplicate caching in a storage system with plural partitions, which are obtained by dividing a disk cache into plural disk cache partitions, by sharing the same data among the partitions.

In order to achieve the above object, an embodiment of this invention provides a storage system which has first control information which describes maps between data on each disk cache segment and a track in hard disk drives, and second control information which describes states of each disk cache segment which is allocated to a disk cache partition by the storage system states. The first control information includes sharing information which describes a segment of the disk cache is shared by plural disk cache partitions. The second control information includes information on each the disk cache segments allocated to a disk cache partition, and pointers to the first control information. As a result, the storage system operates as if a single data in the disk cache existed in multiple disk cache partitions Therefore the storage system can avoid duplicate caching.

According to an embodiment of this invention, when a disk cache of a storage system is divided into plural partitions, data can be shared among the plural partitions, resulting in avoiding duplicate caching.

BRIEF DESCRIPTION OF THE DRAWINGS

The present invention can be appreciated by the description which follows in conjunction with the following figures, wherein:

FIG. 2 is a diagram showing a disk cache control table of a storage system according to the first embodiment;

FIG. 4 is a diagram showing a disk cache partition control table of the storage system according to the first embodiment;

FIG. 6 is a diagram showing a shared cache control table of the storage system according to the first embodiment;

FIG. 15 is a diagram showing a hard disk drive attribute table according to the second embodiment;

DESCRIPTION OF THE PREFERRED EMBODIMENTS

A description will now be given of embodiments of this invention with reference to drawings.

First Embodiment

Figure 1:
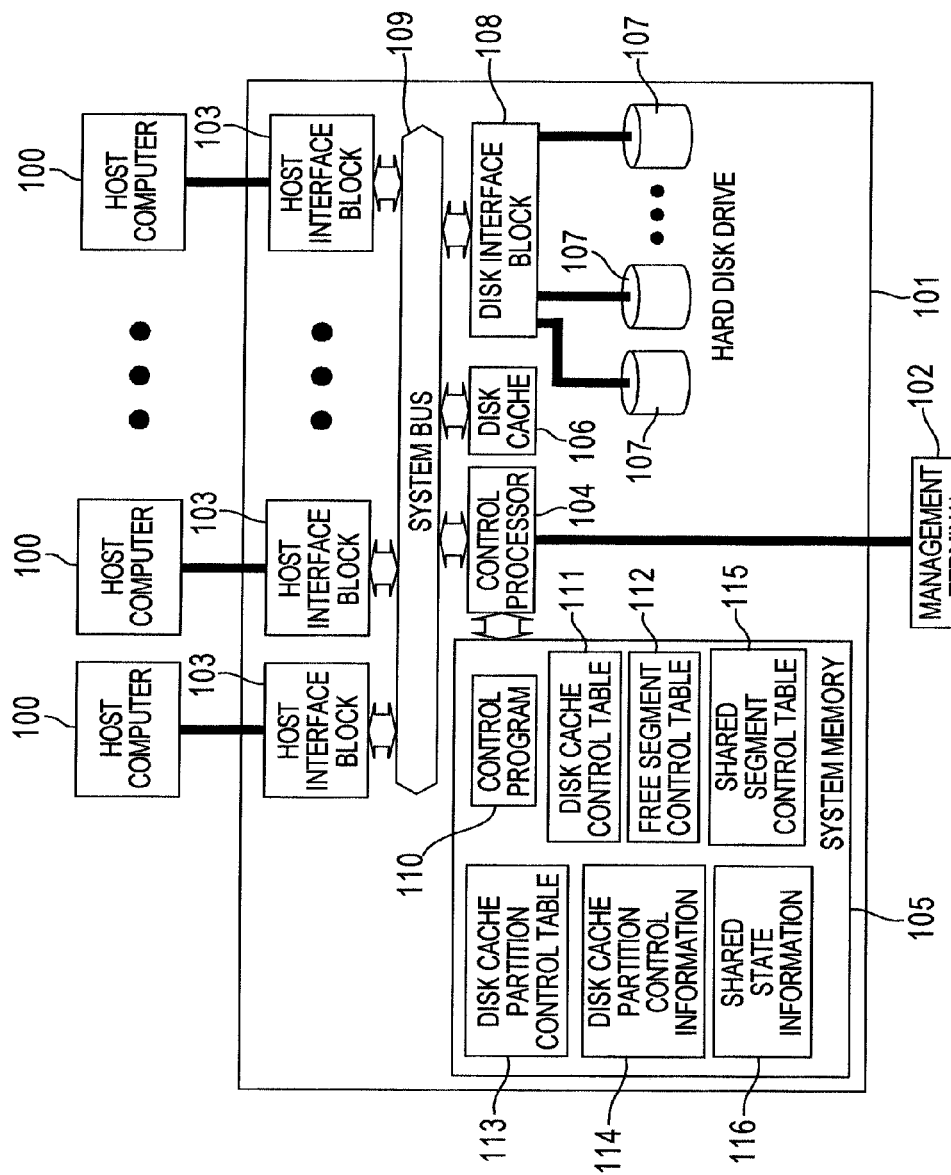
FIG. 1 is a block diagram showing a hardware configuration of a computer system according to a first embodiment.

FIG. 1 shows a hardware configuration of a computer system according to a first embodiment.

The computer system according to the first embodiment includes host computers 100, a storage system 101, and a management terminal 102.

The storage system 101 includes host computer interface blocks 103, a control processor 104, a system memory 105, a disk cache 106, hard disk drives 107, a disk interface block 108, and a system bus 109.

The host interface block 103 communicates with the host computer 100. The control processor 104 controls the entire storage system 101. The system memory 105 stores control information and a program used by the control processor 104 to control the storage system.

The disk cache 106 temporarily stores data of the hard disk drives 107. The hard disk drives 107 are non-volatile media, and store data used by the host computers 100. The disk interface unit 108 controls the hard disk drives 107 to communicate therewith.

The system bus 109 connects the host interface blocks 103, the control processor 104, the disk cache 106, and the disk interface block 108 with each other.

The control program 110 divides memory area of the disk cache 106 into a certain fixed size memory areas. And the control processor 104 manages each of the fixed size memory area. In other words, the control program 110 recognizes the disk cache 106 as a set of the units with the fixed size. Herein, the fixed size memory area of the disk cache 106 is referred to as segment. It is apparent that this invention is independent of the capacity of the segment.

The control program 110 divides memory area of each hard disk drive 107 into a certain fixed size memory areas. In other words, the control program 110 recognizes the hard disk drives 107 as a set of the units with the fixed size. Herein, the certain fixed size memory area of the hard disk drives 107 is referred to as track. It is apparent that this invention is independent of the capacity of the track.

This description is given under a condition which the segment capacity equals to the track capacity. But the segment capacity may not equal to the track capacity. In other words, this invention is independent of the relationship between the track capacity and the segment capacity.

The control program and the various control information used by the control processor 104 are stored in the system memory 105.

The control program 110 is executed by the control processor 104. The control processor 104 controls the storage system 101 by executing the control program 110. The control program 110 is usually stored in a non-volatile memory (not shown) such as a flash memory. The control program 110 is transferred from the non-volatile memory to the system memory 105 immediately after the storage system 101 is powered on, and is executed by the control processor 104. It should be noted that the control program 110 may not be stored in the non-volatile memory, but in the hard disk drive 107.

The control information used by the control processor 104 or the control program 110 executed by the control processor 104 includes a disk cache control table 111, a free segment control table 112, a disk cache partition control table 113, a disk cache partition control information 114, a shared segment control table 115, and a shared state information 116.

The disk cache control table 111 describes which tracks of the hard disk drives 107 data held by the segments in the disk cache 106 are from. The free segment control table 112 describes free segments in the disk cache 106. The disk cache partition control table 113 describes capacities of the respective disk cache partitions (the disk cache allocated to the respective host computers), and the like.

The disk cache partition control information 114 describes respective segments in the disk cache 106 allocated to the respective disk cache partitions. The shared segment control table 115 describes shared states of the respective segments in the disk cache 106 by plural disk cache partitions. The shared state information 116 is a part of the shared segment control table 115, and indicates disk cache partitions using the respective segments.

The first embodiment exemplifies the storage system 101 which includes only one control processor 104. The storage system 101 may have plural control processors 104. When the storage system have plural processors 104, the disk cache control table 111, the free segment control table 112, the disk cache partition control table 113, the disk cache partition control information 114, the shared segment control table 115, and the shared state information 116 are stored on a memory medium which the plural processors 104 can refer to, and modify. Moreover, to guarantee consistency of data, it is also necessary for the control processors 104 to atomically modify the information.

The hard disk drives 107 according to this embodiment may be configured as RAID (Redundant Array of Independent Disks). It is apparent that this invention is independent of the configuration of the hard disk drives 107.

The management terminal 102 is a computer used by an administrator to operate the storage system.

FIG. 2 shows the disk cache control table 111.

The disk cache control table 111 includes entry numbers 200, track numbers 201, segment numbers 202, sharing partitions numbers 203, and state 204.

The entry number 200 is a unique identifier for information indicated in the table. Respective entries correspond to used segments in the disk cache 106.

The track number 201 is a number assigned to a track in the hard disk drives 107 in which data held in the segment is recorded.

The segment number 202 is a number assigned to a segment. The control program 110 reads the track number 201 and the segment number 202 and judge where data in a segment to be stored in a track of hard disk drive 107.

The control program 110 specifies location in the hard disk drives 107 with the track number. But the control program 110 may specify the location in a different manner. For example, according to the SCSI (Small Computer System Interface) standard, a stored location of data can be specified by a combination of an LUN (Logical Unit Number) which is an identifier of the hard disk drive 107, and an LBA (Logical Block Address) which is an internal address of the hard disk drive 107.

The shared partitions number 203 indicates the number of disk cache partitions using the segment. When one disk cache partition uses the segment, "1" is set to the sharing partitions number 203. When two disk cache partitions uses the segment, "2" is set to the sharing partitions number 203.

The state 204 indicates a state of the segment. More specifically, after the host computer 100 wrote data in the disk cache 106, when the data has not yet been written to the hard disk drive 107, the state 204 is "dirty". When the data in the disk cache 106 has been written to the hard disk drive 107, the state 204 is "clean".

Figure 3:
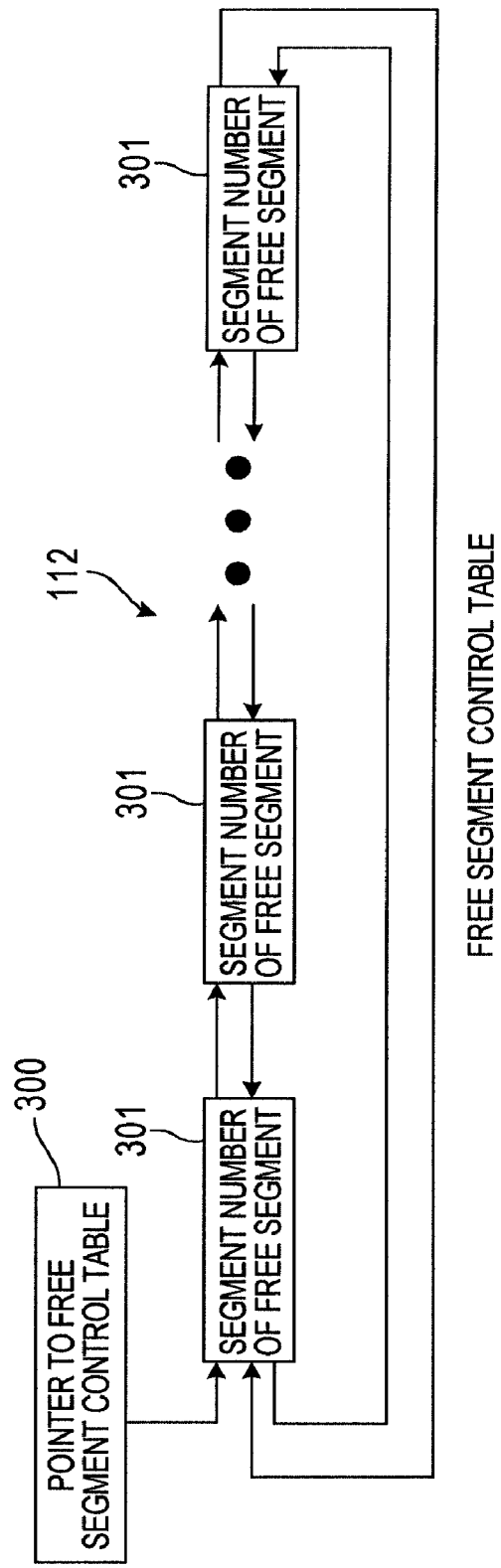
FIG. 3 is a diagram showing a free segment control table of the storage system according to the first embodiment.

FIG. 3 shows the free segment control table 112.

The free segment control table 112 includes a pointer to free segment control table 300 and segment numbers of free segment 301, and is constructed in a form of a linked list.

The pointer to free segment control table 300 is a pointer to information at the head of the linked list. The control program 110 always holds this pointer to search information on the free segments.

The segment number of free segment 301 is information describing the number of a free segment in the disk cache 106. The segment number of free segment 301 includes a forward reference pointer to refer to a previous segment number of free segment 301. Moreover, the segment number of free segment 301 includes a backward reference pointer to refer to a following segment number of free segment 301. The forward reference pointer and backward reference pointer form the linked list.

In other words, the segment number of free segment 301 is a structure including the segment number of a free segment in the disk cache 106 and the pointers.

FIG. 4 shows the disk cache partition control table 113.

The disk cache partition control table 113 includes partition numbers 400, requester identifiers 401, allocated capacities 402, used capacities 403, and pointers to disk cache partition control information 404.

The partition number 400 is a unique identifier of a disk cache partition.

The requester identifier 401 is an entry used to register an identifier of the host computer 100. It is only necessary for the identifier to uniquely identify the host computer 100.

For example, when the host computer 100 and the storage system 101 are connected via a fibre channel interface, a WWN (World Wide Name) uniquely assigned to a fibre channel host adaptor (not shown) of the host computer 100 may be the identifier.

Moreover, there may be a configuration where one disk cache partition is allocated to plural host computers. According to this configuration, the identifiers of the plural host computers 100 may be registered to the requester ID 401. Moreover, the same identifier may be allocated to plural host computers 100. The identifier is transmitted to the storage system 101 when the host computer 100 transmits a disk I/O command to the storage system 101.

The control processor 104 or the control program 110 refers to the identifier or the requester identifier 401 to judge to which disk cache partition the command has been issued.

The allocated capacity 402 is a capacity of the disk cache allocated to the disk cache partition by the administrator of the storage system 101, and is registered by the control processor 104.

The used capacity 403 is a capacity used in the disk cache partition, and is registered by the control processor 104.

The pointer to disk cache partition control information 404 is a pointer to the disk cache partition control information 114. The disk cache partition control information 114 exists for the respective disk cache partitions, and is a linked list of segments used by the disk cache partition.

Figure 5:
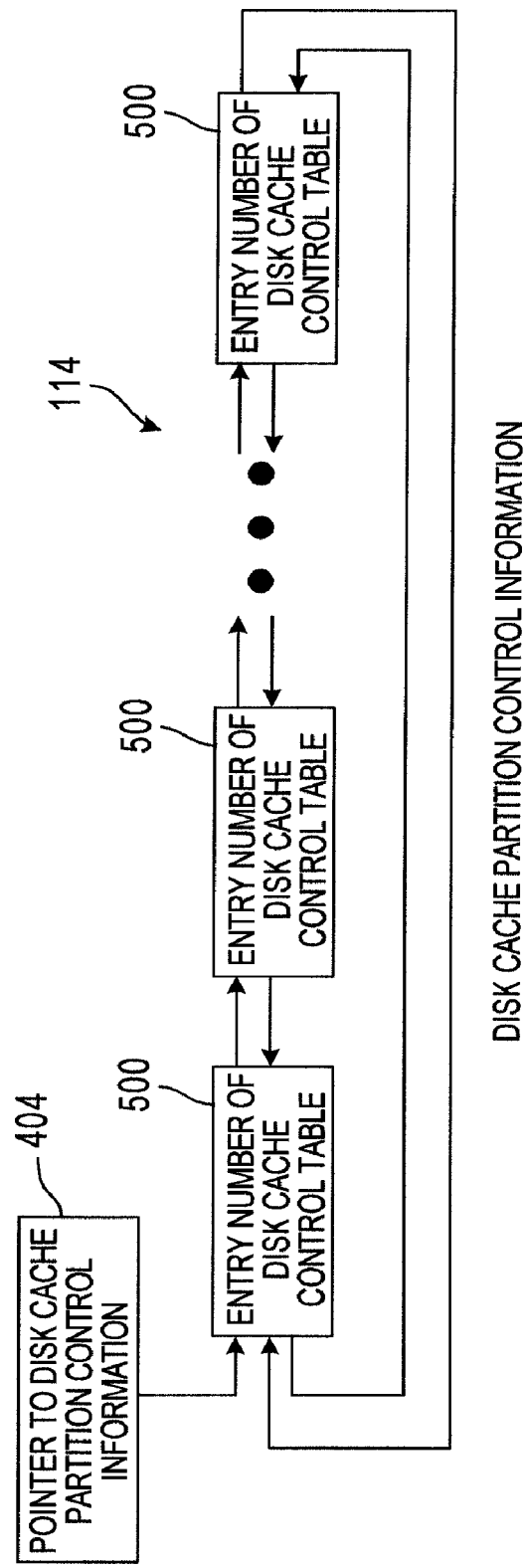
FIG. 5 is a diagram showing disk cache partition control information of the storage system according to the first embodiment.

FIG. 5 shows the disk cache partition control information 114.

The disk cache partition control information 114 includes the pointer to disk cache partition control information 404 and entry numbers of disk cache control table 500, and is constructed in a form of a linked list.

The pointer to disk cache partition control information 404 is a pointer to a head entry of the linked list.

The entry number of disk cache control table 500 indicates an entry number 200 in the disk cache control table corresponding to a segment used by the disk cache partition. Further, the entry number of disk cache control table 500 includes a forward reference pointer to refer to a previous entry number 500. Moreover, the entry number of disk cache control table 500 includes a backward reference pointer to refer to a following entry number 500. The forward reference pointer and backward reference pointer form the linked list.

In other words, the entry number of disk cache control table 500 is a structure including the entry number 200 of the disk cache control table 111 corresponding to the segment used by the disk cache partition, and the forward pointer and the backward pointer. The disk cache partition control information 114 is information in a form of a linked list representing the segments used by the respective disk cache partitions.

FIG. 6 shows the shared segment control table 115.

The shared segment control table 115 includes entry numbers 600, track numbers 601, and pointers to shared state information 602.

The entry number 600 is the same as the entry number 200 in the disk cache control table 111, and is registered by the control processor 104.

The track number 601 is the same as the track number 201 in the disk cache control table 111, and is registered by the control processor 104.

The pointer to shared state information 602 is a pointer to the shared state information 116.

In other words, as FIG. 6 shows, the shared cache control table indicates the state of the respective segments used by plural disk cache partitions.

Figure 7:
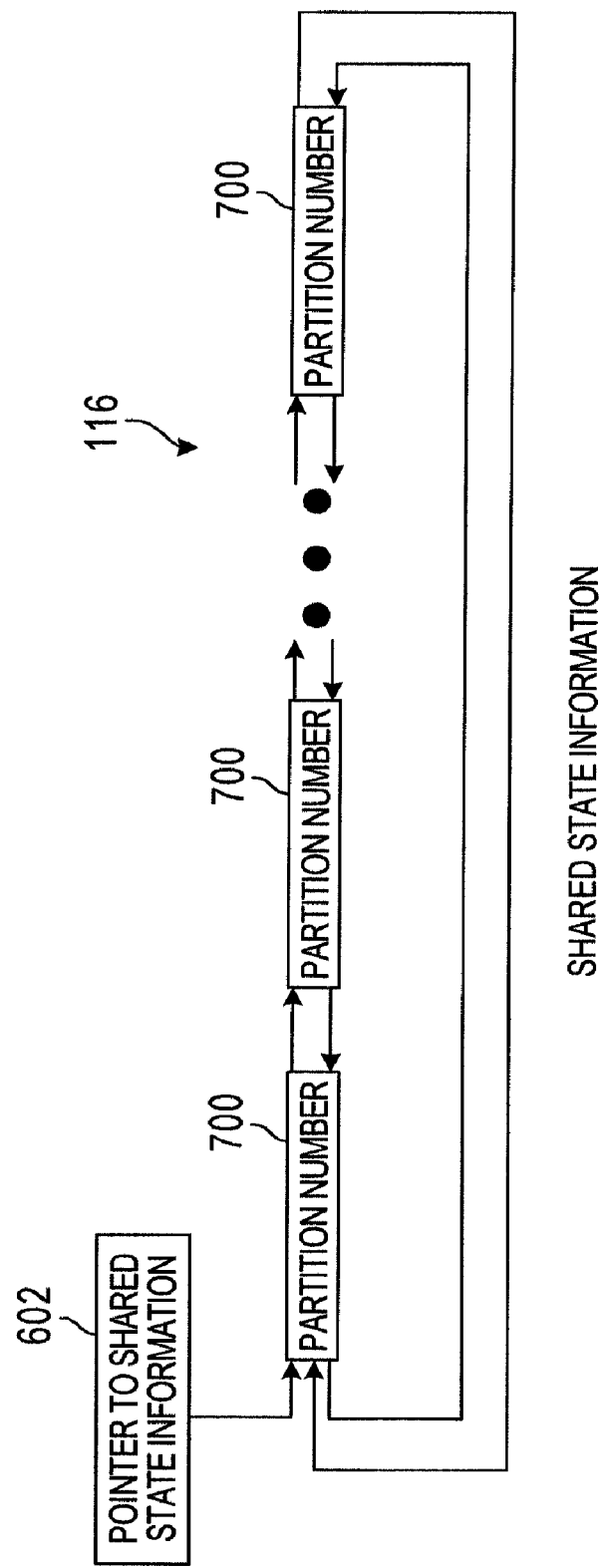
FIG. 7 is a diagram showing shared state information of the storage system according to the first embodiment.

FIG. 7 shows the shared state information 116.

The shared state information 116 includes the pointer to shared state information 602 and partition numbers 700, and is constructed in a form of a linked list.

The pointer to shared state information 602 indicates a head entry of the list.

The control processor 104 registers the number of a disk cache partition using the segment to the partition number 700.

In other words, the control program 110 can describe the state of a segment shared by plural disk cache partitions by means of the shared cache control table 115 and the shared state information 116. In this embodiment, the information of the sharing partitions number 203 in the disk cache control table 111 is sufficient for describing a state where a segment in the disk cache 106 is shared. However, in an actual product, faults or defects tend to occur when a shared resource such as a segment is shared by plural components. To correct the faults, it is necessary to identify a cause of the faults, and thus to know a more detailed state of the resource. In this case, the detailed information such as the shared segment control table 115 and the shared state information 116 assist the designer of the product to identify the cause of the faults.

A description will now be given of an operation of the storage system 101 when the host computer 100 issues the disk I/O command to the storage system 101.

Figure 8:
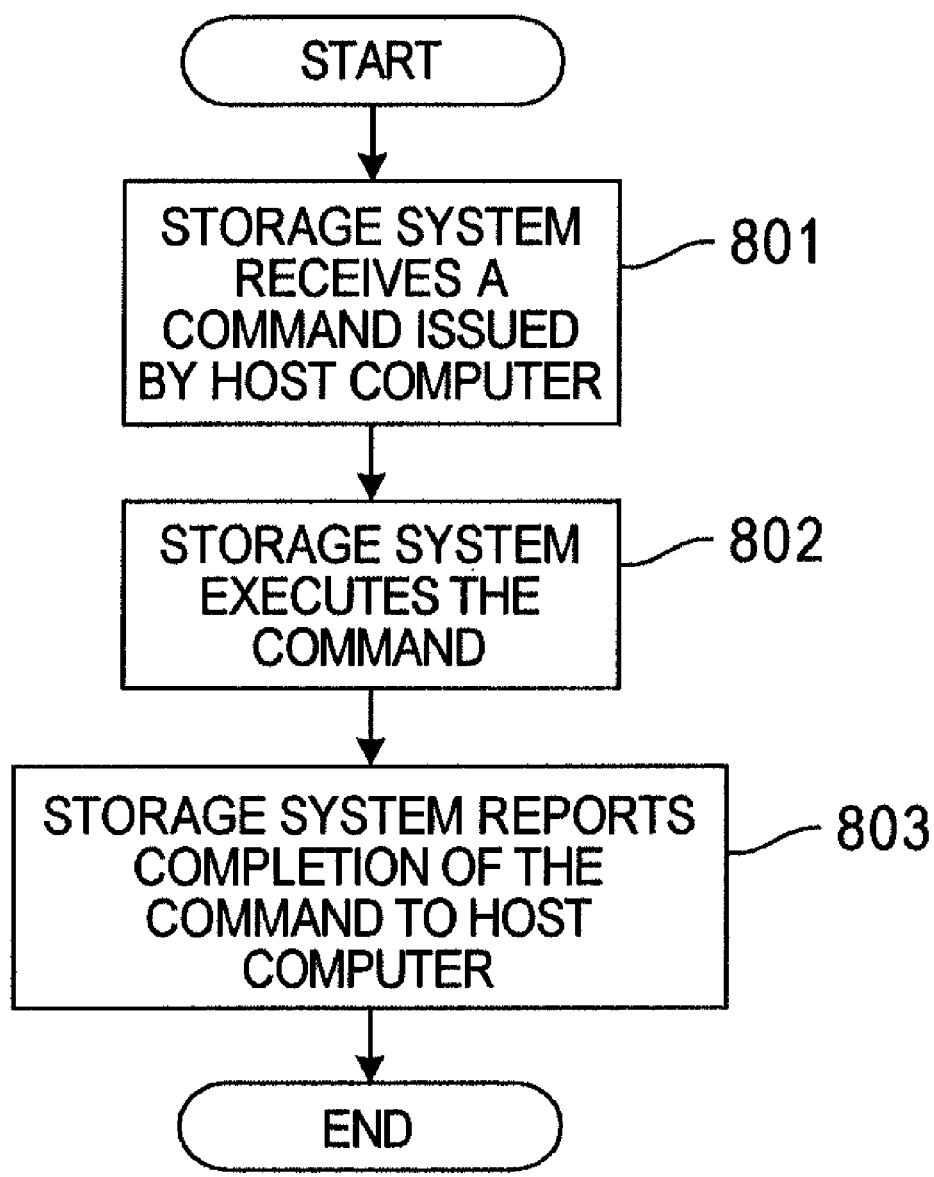
FIG. 8 is a flow chart showing a disk input/output process of the storage system according to the first embodiment.

FIG. 8 shows a flow chart when the storage system 101 processes the disk I/O command.

First, in a step 801, the storage system 101 receives the disk I/O command issued by the host computer 101.

Then, in a step 802, the control processor 104 or the control program 110 executed by the control processor 104 analyzes the disk I/O command, and carries out processing according to the command. For example, if the storage system 101 is compliant with the SCSI standard, the disk I/O commands include commands used for the input/output such as a READ command and a WRITE command, and commands used to control the hard disk drive 107 such as REQUEST SENSE.

Then, in a step 803, the control processor 104 transmits a result of the execution of the command to the host computer 100. For example, when the storage system 101 is compliant with the SCSI standard, a result of the execution (referred to as status in SCSI standard) is transmitted. A status "GOOD" indicates a normal end, and a state "CHECK CONDITION" indicates an abnormal end of the command. The host computer 100 checks the status, and decides a next operation.

Then, the storage system 101 completes the processing of the disk I/O command.

process of a read command and a write command is now described. Those are the most frequently used among the disk I/O commands.

Figure 9:
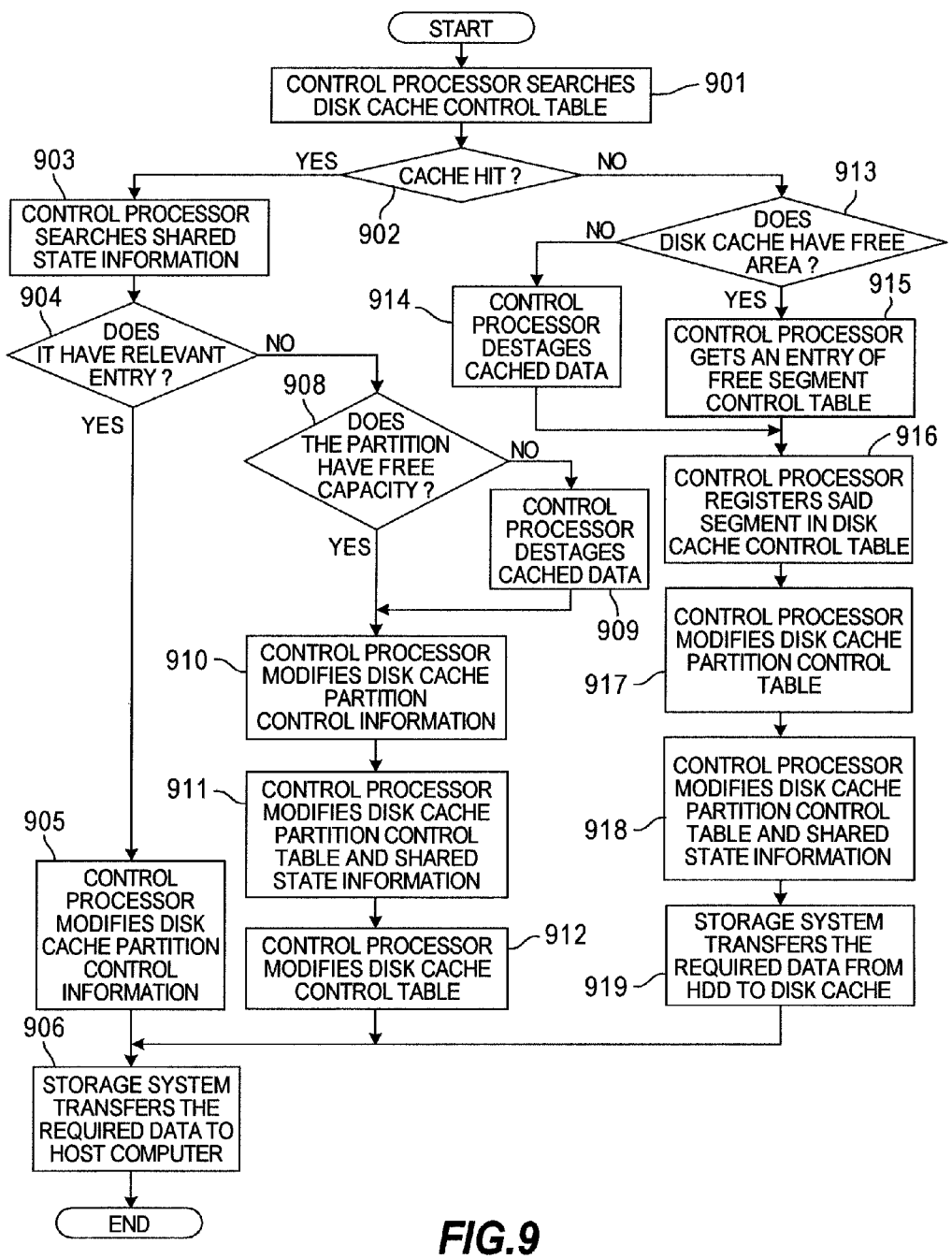
FIG. 9 is a flow chart showing a read process of the storage system according to the first embodiment.

FIG. 9 shows a flow chart of the processing of the read command. The control processor 104 carries out the processing of the read command.

First, when the control processor 104 receives the read command from the host computer 100, the control processor 104 analyzes the content of the read command (step 901). Specifically, the read command includes a track number and the size of data which the host computer 100 requests. Thus, the control processor 104 searches the disk cache control table 111 for a segment holding the data stored in a track corresponding to the track number.

Further, the host computer 100 transmits an identifier of the host computer along with the command to the storage system 101. Thus, the control processor 104 can identify a disk cache partition corresponding to the disk I/O command.

Then, the control processor 104 judges whether the corresponding segment is present in the disk cache control table 111. When the corresponding segment is present in the disk cache control table 111 the control processor 104 judges as "cache hit". And the operation proceeds to the step 903. On the other hand, If the corresponding segment is not present in the disk cache control table 111, the control processor 104 judges as "cache miss". And the operation proceeds to the step 913 (step 902).

Upon judging "cache hit" the control processor 104 has to judge whether the hit occurs in the disk cache partition allocated to the host computer 100. Because an upper limit is set for the capacity of the respective disk cache partitions.

Specifically, the control processor 104 searches the shared state information 116 (step 903). The control processor 104 judges whether the disk cache partition has already been registered to the shared state information 116 (step 904). As a result of the judgment, if the disk cache partition has already been registered, the control processor 104 judges that a "hit" occurs. And the operation proceeds to the step 905. On the other hand, if the disk cache partition has not been registered, the control processor 104 judges that a "miss" occurs. And the operation proceeds to the step 908.

The control processor 104 also modifies the disk cache partition control information 114 if the control processor 104 judges the disk cache partition entry is present in shared state information 116 (step 905). Specifically the control processor 104 moves the entry number of disk cache control table 500 corresponding to the segment to the head of the linked list. Repeating this process the entries of the disk cache partition control information 114 are arranged in an order of the frequency of access. In other words, a segment corresponding to an entry at the tail of the disk cache partition control information 114 will have the lowest frequency of access. According to LRU algorithm the control processor flushes the data in the segment corresponding to the entry at the tail to the hard disk drives 107, if necessary.

Then the control processor 104 transfers the data requested by the host computer 100 from the disk cache 106 to the host computer 100 and completes the processing of the read command (step 906).

On the other hand, if the control processor 104 judges that an entry of the disk cache partition is not present the segment is not registered to the disk cache partition. The respective disk cache partitions have an upper limit of the capacity. Thus the control processor 104 refers to the disk cache partition control table 113 to judge whether the disk cache partition has a free capacity (step 908).

As a result, if the disk cache partition does not have a free capacity the control processor 104 releases a required number of segments used by the disk cache partition (step 909). Steps of the releasing will be described later. Then, the operation proceeds to the step 910.

If the disk cache partition has sufficient free segments the control processor 104 adds an entry number of disk cache control table 500 to the disk cache partition control information 114 of the disk cache partition (step 910). The entry number of disk cache control table 500 corresponds to the segment. The control processor 104 inserts the entry numbers 500 at the head of the linked list. This process is carried out according to the LRU algorithm.

Then, the control processor 104 modifies the disk cache partition control table 113 and the shared state information 116 (step 911). Specifically, the control processor 104 adds the size of the segment to the used capacity 403 of the disk cache partition control table 113. The control processor 104 adds a disk cache partition number 700 to which the disk cache partition number is set to the shared state information 116.

Then, the control processor 104 modifies the disk cache control table 111. Specifically, the control processor 104 increments the sharing partitions number 203 of the segment in the disk cache control table 111. Because the disk cache partition is now sharing the segment (step 912).

On the other hand, if the control processor 104 judges that a cache miss occurs in the step 902, there required data is not present in the disk cache 106. Thus, the storage system 101 has to load the required data from the hard disk drive 107 to the disk cache 106. The control processor 104 refers to the free segment control table 112 to judge whether there are free segments (step 913).

As a result, if there are no free segments in the disk cache 106 a segment presently in use is released (step 914). If the state of the segment to be released is "dirty", the control processor 104 flushes the data stored in the "dirty" segment to the hard disk drive 107. Steps will be described in detail later. Then, the control processor proceeds to the step 916.

On the other hand, if there are free segments in the disk cache 106, in the step 913, the control processor 104 obtains sufficient entries of a segment number of free segments 301 in the free segment control table 112.

Then, the control processor 104 registers information on the segment to the disk cache control table 111 (step 916). In other words, an entry number 200, a track number 201, and a segment number 202 are set, and a shared partitions number 203 is set to "1". Further, the state 204 is set to "clean".

Then, the control processor 104 adds an entry number of disk cache control table 500 (step 917). Said entry number corresponds to the segment to the disk cache partition control information 114 of the disk cache partition. The entry number 500 is added to the head of the linked list. This processes also carried out according to the LRU algorithm.

Then, the control processor 104 modifies the disk cache partition control table 113 and the shared state information 116 (step 918). Specifically, the control processor 104 adds the size of the segment to the used capacity 403 of the disk cache partition control table 113, and adds a disk cache partition number 700 to which the disk cache partition number is set to the shared state information 116.

Then, the control processor 104 transfers the requested data in the hard disk drives 107 to the segment (step 919). Then, the operation proceeds to the step 906, and transfers the data to the host computer 100.

A description will now be given of processing of the write command by the control processor 104.

Figure 10:
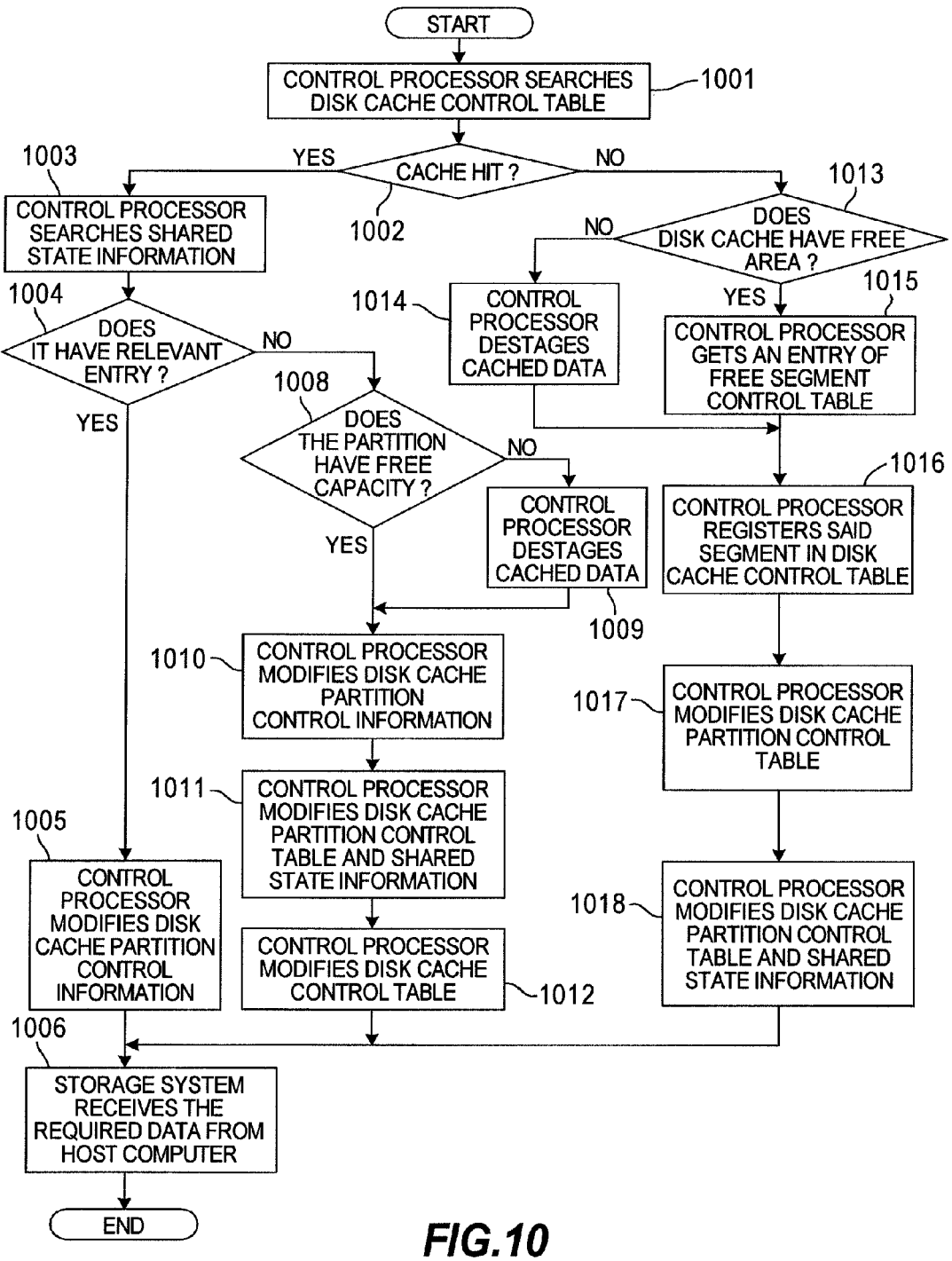
FIG. 10 is a flow chart showing a write process of the storage system according to the first embodiment.

FIG. 10 shows a flow chart of the process by the control processor 104. The process of the write command shown in FIG. 10 is almost similar to the processing of the read command shown in FIG. 9.

Actually, when the storage system 101 receives data from the host computer 100, and stores the data in the disk cache 106, the storage system 101 can report the completion of the write command. Thus, a designer can consider process which writes the data transmitted by the host computer 100 in a free segment without judging whether cash hit occurs or not. This process is different from the processing of the read command. Therefore, although there may be a flow chart different from that shown in FIG. 10, for the sake of better understanding, a description will be given such processing that symmetrical to the processing of the read command.

First, when the control processor 104 receives the write command from the host computer 100, the control processor 104 analyzes the content of the write command (step 1001). Specifically, the write command includes a track number and the size of data which the host computer 100 requests. Thus, the control processor 104 searches the disk cache control table 111 for a segment holding the data stored in a track corresponding to the track number.

Further, the host computer 100 transmits an identifier of the host computer along with the command to the storage system 101. Thus, the control processor 104 can identify a disk cache partition corresponding to the disk I/O command.

Then, the control processor 104 judges whether the corresponding segment is present in the disk cache control table 111. If the corresponding segment is present in the disk cache control table 111, the control processor 104 judges "cache hit". And the operation proceeds to the step 1003. On the other hand, If the corresponding segment is not present in the disk cache control table 111 the control processor 104 judges "cache miss" And the operation proceeds to the step 1013 (step 1002).

Upon the judging "cache hit", the control processor 104 has to judge whether the hit occurs in the disk cache partition allocated to the host computer 100. Because an upper limit is set for the capacity of the respective disk cache partitions.

Specifically, the control processor 104 searches the shared state information 116 (step 1003). And the control processor 104 judges whether the disk cache partition has already been registered to the shared state information 116 (step 1004). As a result of the judgment, If the disk cache partition has been registered, the control processor 104 judges "hit". And the operation proceeds to a step 1005. If the disk cache partition has not been registered the control processor 104 judges "miss". And the operation proceeds to the step 1008.

If the control processor 104 judges that an entry of the disk cache partition is present the control processor 104 modifies the disk cache partition control information 114 (step 1005). In other words, the control processor 104 moves the entry number of disk cache control table 500 to the head of the linked list. The entry number corresponds to said segment. Repeating this process the control processor 104 can arrange the entries of the disk cache partition control information 114 in an order of the frequency of access. According to LRU algorithm the control processor flushes the data in the segment corresponding to the entry at the tail to the hard disk drives 107, if necessary. Then, the control processor 104 transfers the data transferred by the host computer 100 to the disk cache 106, and completes the processing of the write command (step 1006). The process in the step 1006 may be performed at the beginning of the write command process.

On the other hand, If the control processor 104 judges that an entry of the disk cache partition is not present, the segment is not registered to the disk cache partition. The respective disk cache partitions have an upper limit of the capacity. Thus, the control processor 104 refers to the disk cache partition control table 113 to judge whether the disk cache partition has a free capacity (step 1008).

As a result, If the disk cache partition does not have a free capacity the control processor 104 releases a required number of segments used by the disk cache partition (step 1009). Steps of the release will be described later. Then, the operation proceeds to the step 1010.

When the disk cache partition has sufficient free segments, the control processor 104 adds entry numbers of disk cache control table 500 to the disk cache partition control information 114 of the disk cache partition (step 1010). The entry number of disk cache control table 500 corresponds to the segment The entry numbers correspond to the segment. The control processor 104 inserts the entry numbers 500 at the head of the linked list. This process is carried out according to the LRU algorithm.

Then, the control processor 104 modifies the disk cache partition control table 113 and the shared state information 116 (step 1011). Specifically, the control processor 104 adds the size of the segment to the used capacity 403 of the disk cache partition control table 113. The control processor 104 adds a disk cache partition number 700 to which the disk cache partition number is set to the shared state information 116.

Then, the control processor 104 modifies the disk cache control table 111 (step 1012). Specifically, the control processor 104 increments the sharing partitions number 203 of the segment in the disk cache control table 111. Because the disk cache partition is now sharing the segment. Further, the control processor 104 sets "dirty" in the state 204 entry.

On the other hand, if the control processor 104 judges "cache miss" in the step 1002 the required data is not present in the disk cache 106. Thus, the storage system 101 has to load the data from the hard disk drive 107 in the disk cache 106. Then, the control processor 104 refers to the free segment control table 112 to judge whether there are free segments (step 1013).

As a result, if there are no free segments in the disk cache 106 a segment presently in use is released (step 1014). If the state of the segment to be released is "dirty", the control processor 104 flushes the data stored in the "dirty" segment to the hard disk drive 107. Steps will be described in detail later. Then, the operation proceeds to the step 1016.

On the other hand, if there are free segments in the disk cache 106 in a step 1015 the control processor 104 obtains sufficient entries of segment number of free segments 301 in the free segment control table 112.

Then, the control processor 104 registers information on the segment to the disk cache control table 111 (step 1016). In other words, an entry number 200, a track number 201, and a segment number 202 are set, and a sharing partitions number 203 is set to "1". Further, the state 204 is set to "dirty".

Then, the control processor 104 adds an entry number of disk cache control table 500 to the disk cache partition control information 114 of the disk cache partition (step 1017). The entry number corresponds to the segment. The control processor 104 inserts the entry number 500 at the head of the linked list. This process is also carried out according to the LRU algorithm.

Then, the control processor 104 modifies the disk cache partition control table 113 and the shared state information 116 (step 1018). Specifically, the control processor 104 adds the size of the segment to the used capacity 403 of the disk cache partition control table 113, and adds a disk cache partition number 700 to which the disk cache partition number is set to the shared state information 116.

Then, the operation 104 proceeds to the step 1006. And the storage system 101 transfers the data from the host computer 100 to the disk cache 106.

Said data flushing process in the step 909 and 1009 is now described.

Figure 11:
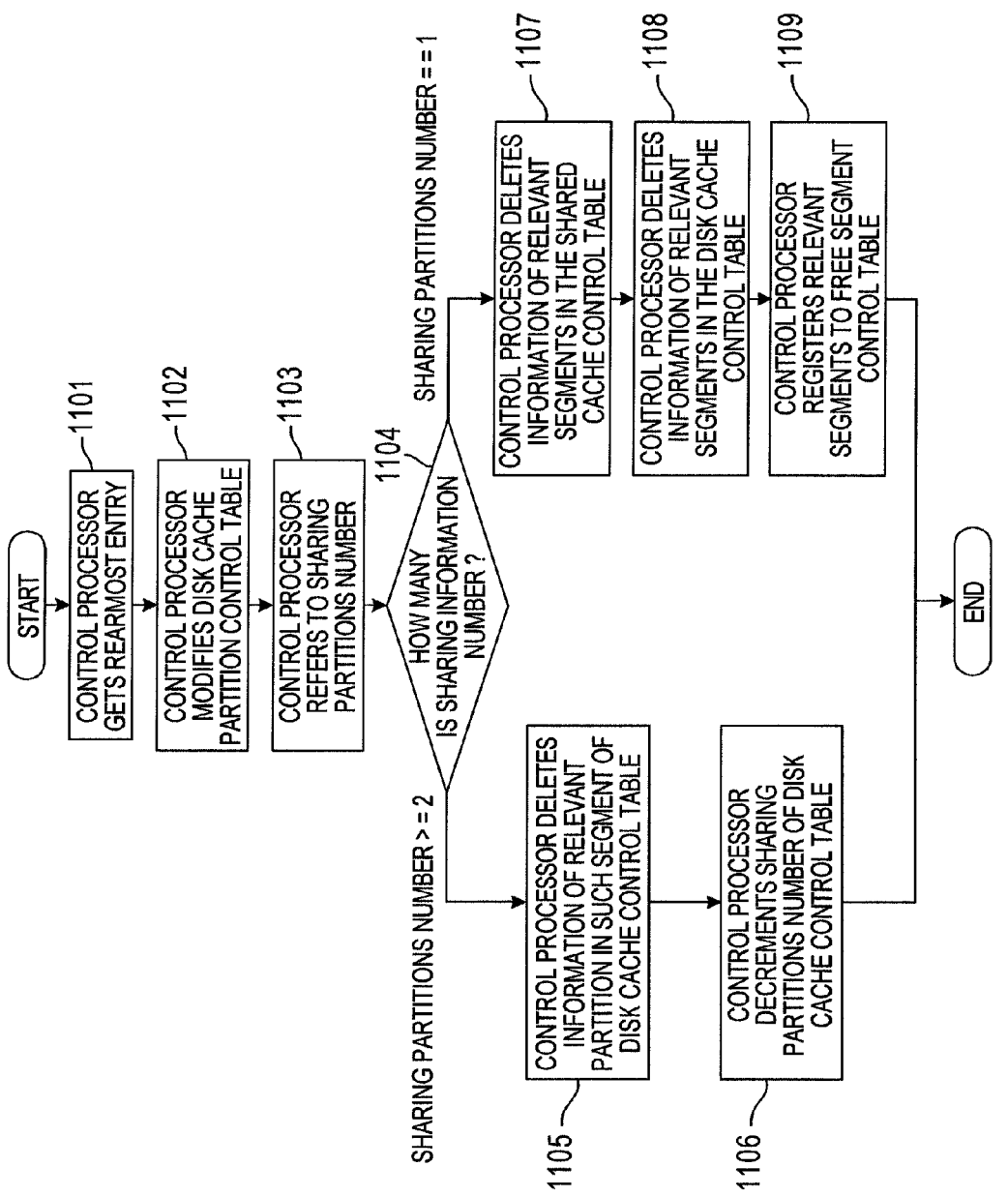
FIG. 11 is a flow chart showing a destage process of the storage system according to the first embodiment.
Figure 13:
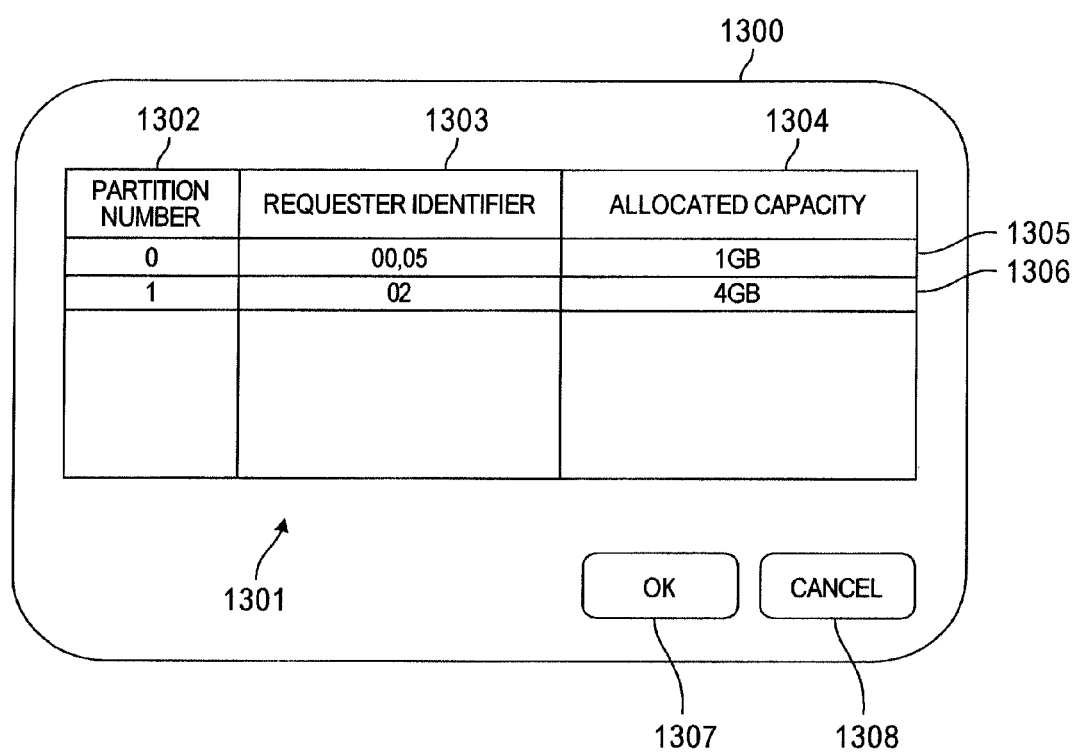
FIG. 13 is a diagram showing a setup window in a screen of a management terminal according to the first embodiment.

FIG. 11 shows a flow chart of the data flushing process. The data flushing process shown in FIG. 11 is carried out if the disk cache 106 as a whole has free segments, and the used capacity of a disk cache partition has reached its upper limit. FIG. 13 describes the data flushing process in case which the disk cache 106 does not have free segment.

First, the control processor 104 obtains the last entry number of disk cache control table in the disk cache partition control information 114 corresponding to the disk partition.

Then, the control processor 104 modifies the disk cache partition table 113 of the disk cache partition (step 1102). Specifically, the used capacity 403 of the disk cache partition is reduced by the size of the segment to be released.

Then, the control processor 104 refers to the sharing partitions number 203 in the disk cache control table 111 (step 1103). Then, the control processor 104 judges whether the sharing partitions number is greater than one or not (step 1104). If the sharing partitions number is not a natural number, it is invalid. So the control processor 104 terminates the process (process relating to the invalid value is not shown).

If the sharing partitions number is greater than one it implies that other disk cache partitions uses the segment. Then, the control processor 104 deletes the partition number 700 indicating the disk cache partition in the shared state information 116 (step 1106).

Then, the control processor 104 decrements the sharing partitions number 203 of the segment in the disk cache control table 111. And the control processor 104 completes the data flushing process (step 1106).

On the other hand, if the sharing partitions number 203 equals to one other disk cache partitions do not use the segment. And it is possible to make the segment free. Thus, the control processor 104 deletes the entry corresponding to the segment in the shared cache control table 115 (step 1107).

The control processor 104 deletes the entry corresponding to the segment in the disk cache control table 111 (step 1108). At this point, if the state 204 of the segment is "dirty", the data held in the segment is written back to the hard disk drive 107, and then the entry is deleted. Segments to be flushed may be limited to segments with the state "clean".

Then, the control processor 104 adds the segment number of the segment to the free segment control table 112, and completes the data flushing process (step 1109).

Figure 12:
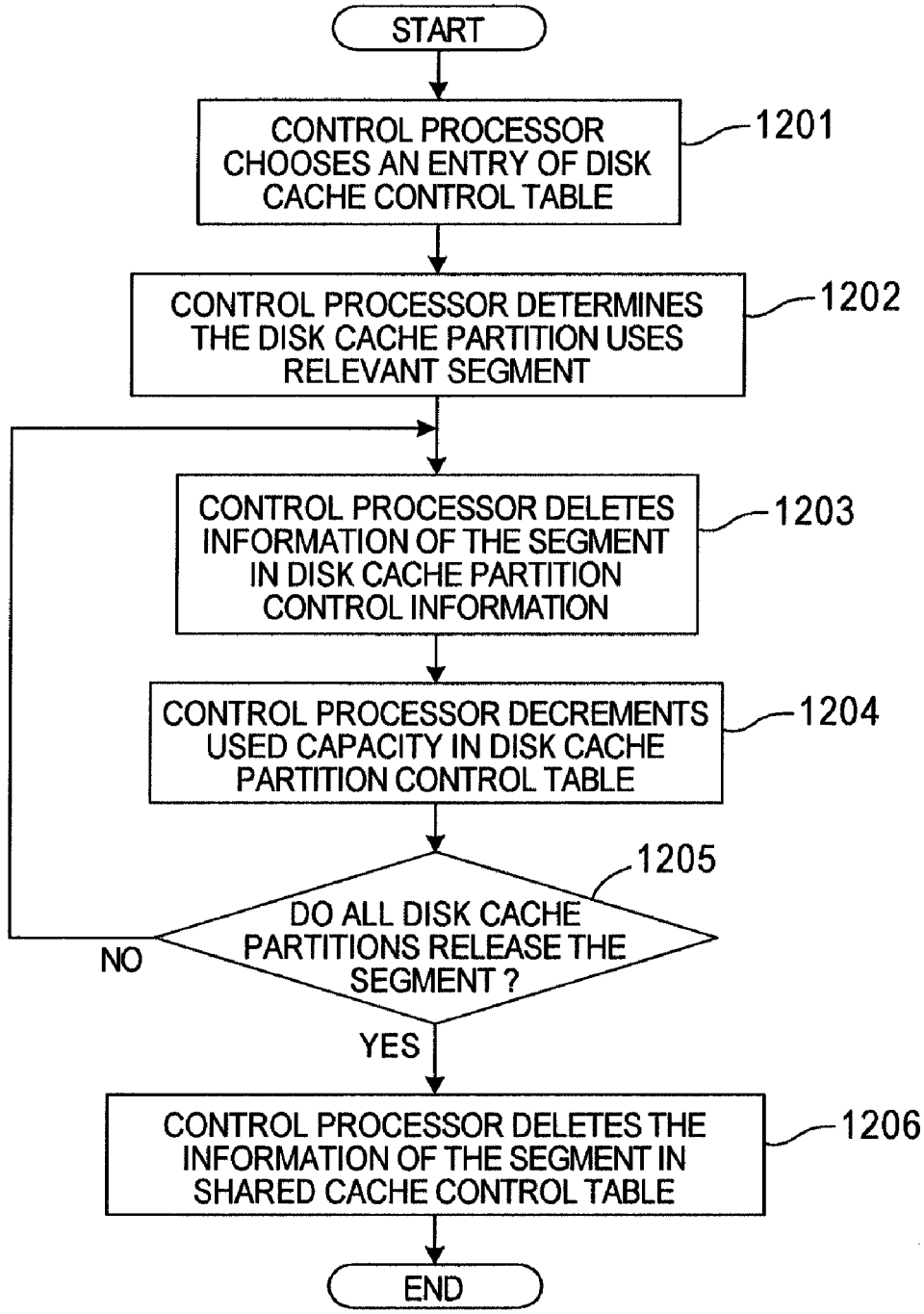
FIG. 12 is a flow chart showing another destage process of the storage system according to the first embodiment.

FIG. 12 shows a flow chart of another data flushing process.

In the data flushing process shown in FIG. 11, the disk cache 106 has free segments as a whole. But used capacity in the disk cache partition to which the disk I/O command has been issued has reached its upper limit. On the other hand, the data flushing process in the step 914 and 1014 is used if the disk cache 106 does not have free segments as a whole.

First, the control processor 104 selects one or more of entries of the disk cache control table 111 (step 1200). For example, the control processor 104 may select segments with the "clean" state. Moreover, the control processor 104 may select the segment with the lowest frequency of access according to the LRU algorithm. Further, if track numbers of stored data are successive in plural segments, the control processor 104 judges that these segments contain a single set of data, and may select these segments at once. It is apparent that this invention is independent of the method of the selection.

Then, the control processor 104 refers to entries corresponding to the segments selected in the step 1200 in the shared cache control table 115 (step 1201).

Then, the control processor 104 identifies disk cache partitions using these segments based on information obtained in the step 1201 (step 1202).

Then, the control processor 104 deletes entry numbers of disk cache control table 500. The entry numbers correspond to the segments from the disk cache partition control information 114 of the disk cache partition identified in the step 1202 (step 1203).

Then, the control processor 104 subtracts the size of the released segments from the used capacity of the disk cache partition 403 in the disk cache partition control table 113 (step 1204).

Then, the control processor 104 judges whether the process from the step 1203 to the step 1204 have been carried out for all disk cache partitions using the segments (step 1205). Then, if the process has been carried out for all the disk cache partitions, the operation proceeds to the step 1206. Otherwise the operation returns to the step 1203 (step 1205).

The control processor 104 deletes information on the segments from the shared segment control table 115 (step 1206).

A description will now be given of how the administrator of the storage system 101 sets the capacities and the like to the respective disk cache partitions.

FIG. 13 shows an example of setup window in screen of the management terminal 102.

Setting information 1301 of the disk cache partitions is displayed on setup window in a screen 1300 of the management terminal 102. The setting information 1301 includes partition numbers 1302, requester identifiers 1303, and allocated capacities 1304.

The partition number 1302 is a section where a number of a disk cache partition is shown and set, and shows the same information as the partition number 400 in the disk cache partition control table 113.

The requester identifier 1303 shows the same information as the requester identifier 401 in the disk cache partition control table 113.

The allocated capacity 1304 is a section where a disk cache capacity allocated to a disk cache partition by the administrator is set and shown. The information set to the allocated capacity 1304 is written to the allocated capacity 402 in the disk cache partition control table 113.

When the administrator selects an OK button 1307, the respective information set in the setting information 1301 is transferred to the control processor 104. The control processor 104 registers the transferred information to the disk cache partition control table 113. If the administrator selects a Cancel button 1308, the respective information set in the setting information 1301 is not transferred to the control processor 104, and discarded.

There are various policies to allocate the capacity to the respective disk cache partitions. For example, a large capacity can be set to a disk cache partition which uses a large capacity on the hard disk drive 107. Moreover, the capacity may be set by estimating a required capacity based on properties of tasks executed by the host computer 100 corresponding to a disk cache partition.

In this embodiment, it is assumed that the storage system 101 is a block storage typified by one compliant with the SCSI standard. A block storage divides the hard disk drive 107 into units of memory area with a fixed size ("track" in the first embodiment), and treats the hard disk drive 107 so as to be recognized by the host computer 100 as a set of the fixed size units.

On the other hand, an operating system running on the host computer 100 permits users to use data in the hard disk drive 107 as files with a variable size. A file is a unit including plural tracks of the hard disk drive 107. Some storage systems employ a file as a unit in an interface with the host computer 100. This type of storage systems has conventionally been referred to as a file server or NAS (Network Attached Storage). Those storage systems are referred to as file storages to be distinguished from the block storages.

This invention is independent of the interface between the host computer 100 and the storage system 101, and it is thus apparent that this invention is applicable to file storages. In other words, a file includes one or more tracks of the hard disk drive 107. Therefore, it is possible to apply the method described in this embodiment to the tracks constituting the file.

Second Embodiment

The description has been given of the first embodiment of this invention assuming the machine configuration which shares data among the disk cache partitions (i.e. host computers). When a host computer modifies data being used by another host computer, an inconsistency may occur to the host computer using the data.

Conventionally, if plural users share the same data, the consistency of the data is guaranteed by an operating system running on a host computer. However, under the environment of the storage consolidation, there is not provided a synchronization mechanism among host computers, and thus an operating system cannot guarantee the consistency. Thus, it is necessary for the storage system to guarantee the consistency.

A description will now be given of this mechanism according to the second embodiment.

Figure 14:
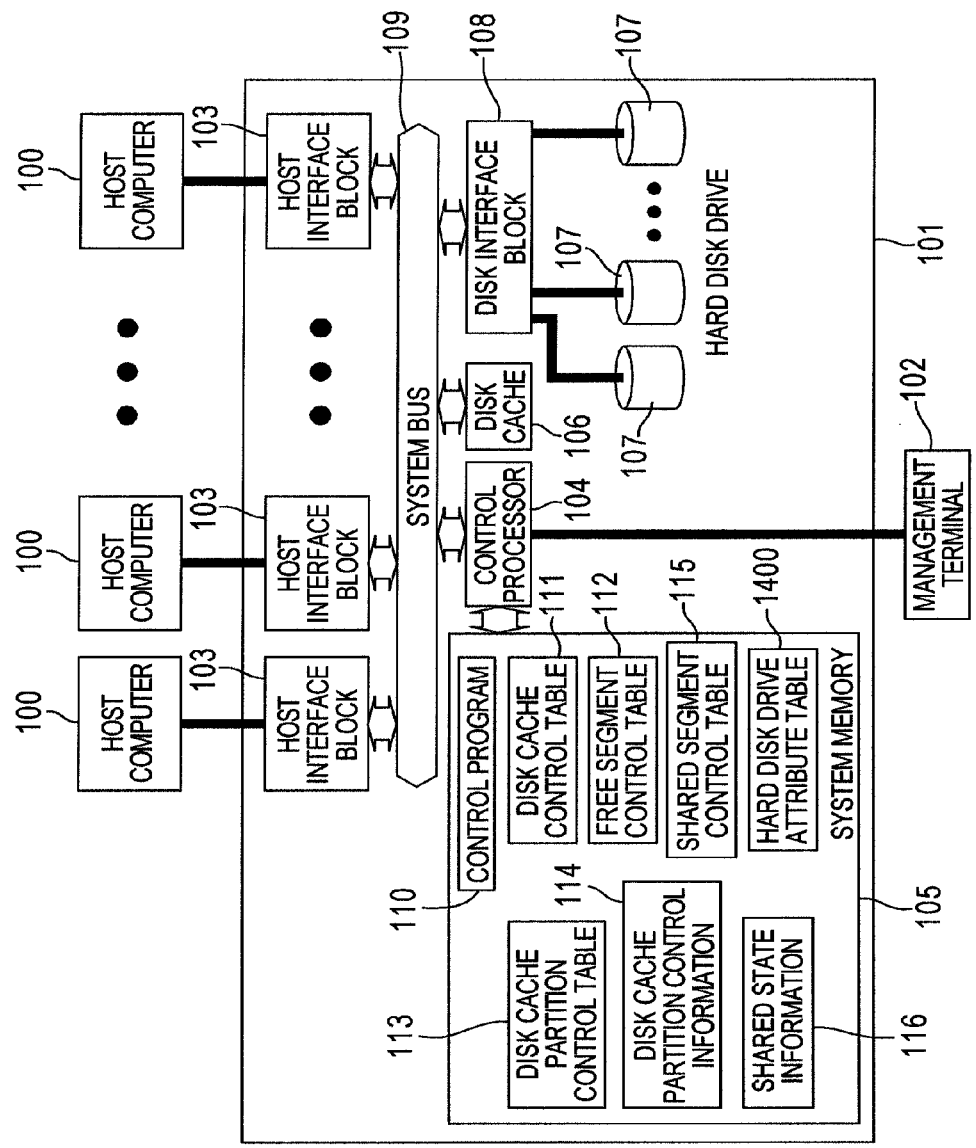
FIG. 14 is a block diagram showing a hardware configuration of a computer system according to a second embodiment.

FIG. 14 shows a hardware configuration of a computer system according to the second embodiment.

A hard disk drive attribute table 1400 is newly added to the storage system 101. The other components are similar to those in FIG. 1, and hence a duplicate description is omitted. The hard disk drive attribute table 1400 describes types of commands permitted for the disk cache partitions of the respective disk drives 107.

FIG. 15 shows the hard disk drive attribute table 1400.

The hard disk drive attribute table 1400 includes hard disk drive numbers 1500, track numbers 1501, a entry of which is used to set a range of track numbers in a hard disk drive, partitions 0 (1502), and partitions 1 (1503).

The hard disk drive number 1500 is an entry used to set the identifier of the hard disk drive 107.

The track number 1501 is an entry used to set a range of track numbers in a hard disk drive.

The partition 0 (1502) and the partition 1 (1503) are entries used to describes commands permitted for the respective disk cache partitions.

In FIG. 15, the disk cache partition 0 is permitted to issue both READ and WRITE command to the hard disk drive with the hard disk number 0. The disk cache partition 1 is permitted to issue READ and WRITE command to the hard disk drive with number 0.

On the other hand, the disk cache partition 0 is permitted to issue both READ and WRITE command to the hard disk drive with the hard disk number 1. But the disk cache partition 1 is permitted to issue only READ command to the hard disk drive with number 1.

Figure 16:
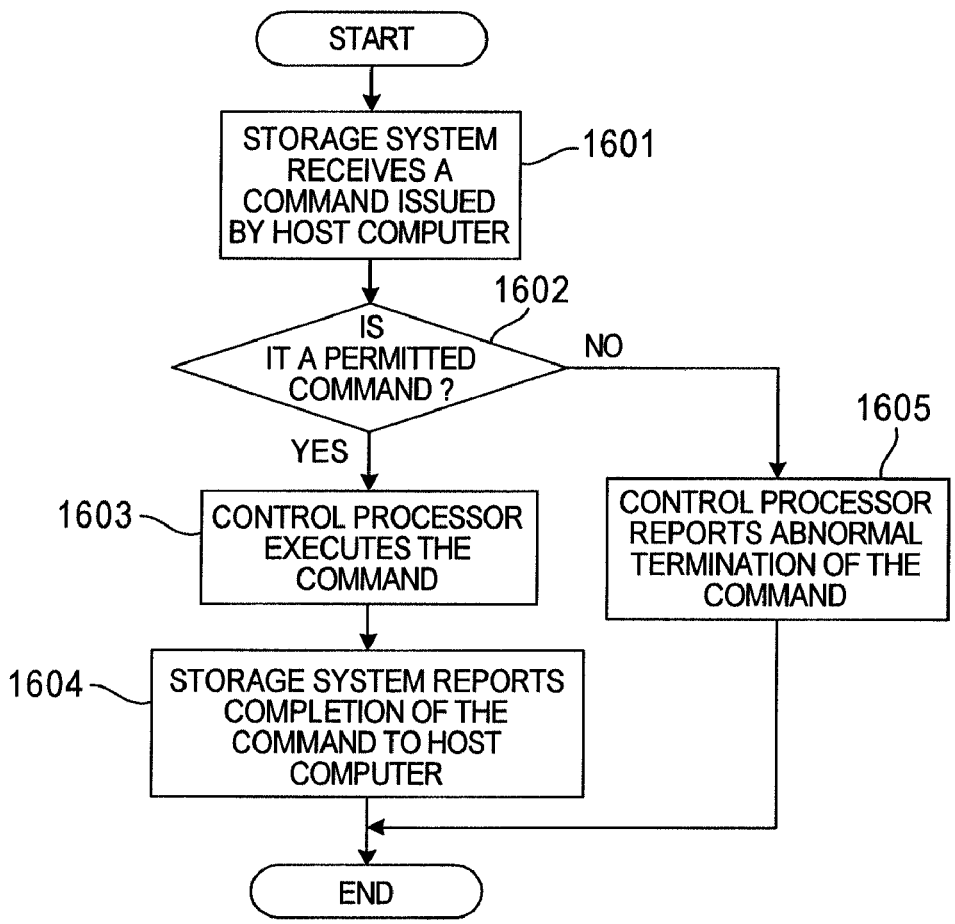
FIG. 16 is a flow chart showing processing of a disk input/output command of the storage system according to the second embodiment.

FIG. 16 shows a flow chart of processing of the disk I/O command of the storage system 101.

First, the storage system 101 receives a disk I/O command transmitted by the host computer 100 (step 1601).

Then, the storage system 101 analyzes the command to identify a target hard disk drive and a targeting disk cache partition, and refers to the hard disk drive attribute table 1400. Then, the storage system 101 judges whether the disk I/O command is permitted (step 1602).

If the command is permitted the storage system 101 executes the command (step 1603). Then, the storage system 101 reports a completion of the command to the host computer 100 (step 1604).

On the other hand, if the command is not permitted the storage system 101 reports an abnormal end of the command to the host computer 100 (step 1605).

As described above, according to this invention, it is possible to avoid the same data are redundantly stored in the disk cache, which has conventionally occurred. Thus, compared with the prior art, it is possible to provide users with a more disk cache capacity corresponding to the redundantly stored data.

Figure 17:
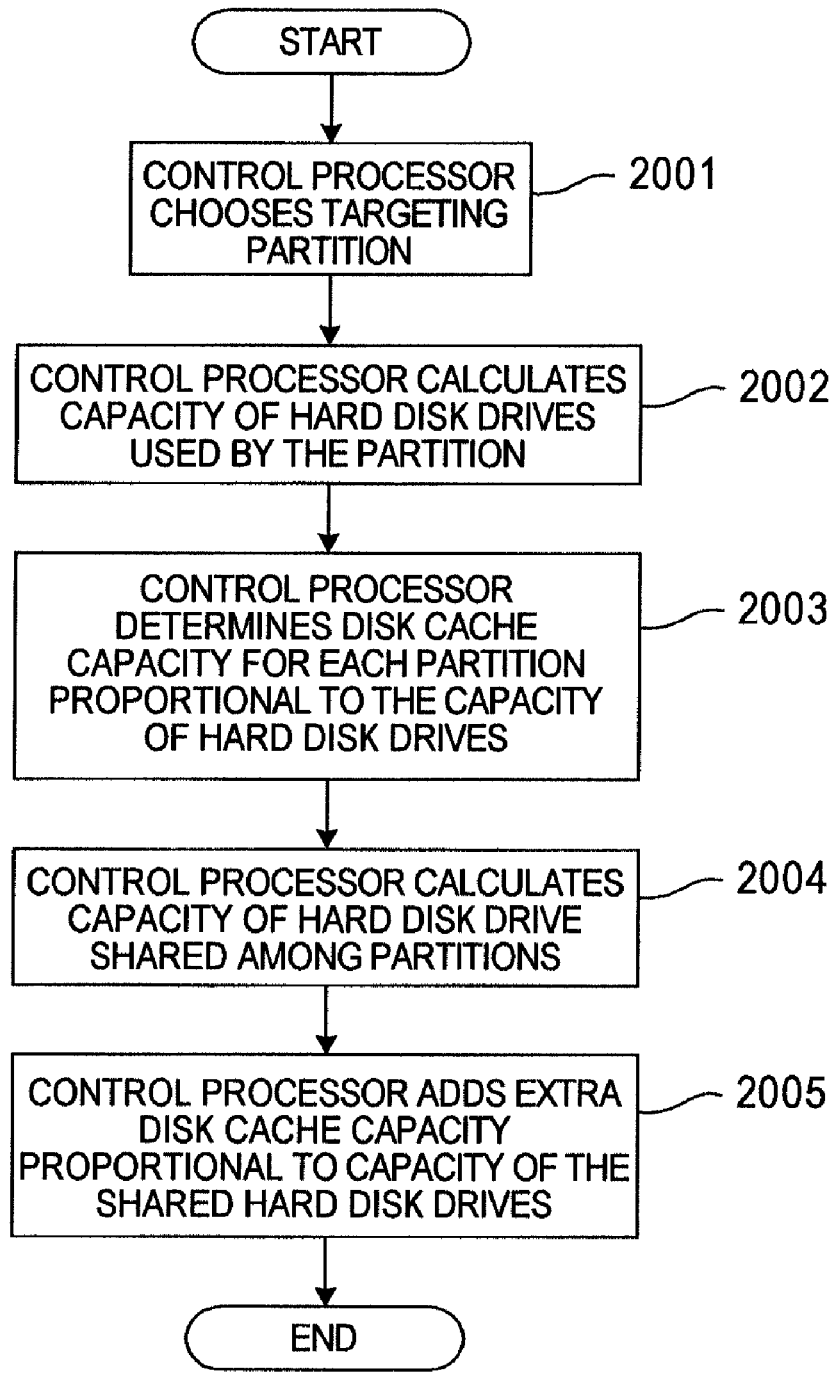
FIG. 17 is a flow chart showing a process used to calculate allocated capacities according to the second embodiment.

FIG. 17 shows a flow chart of a process used to calculate the allocated capacities of the disk cache 106.

First, the administrator selects a disk cache partition whose capacity is calculated.

The control processor 104 refers to the disk cache partition control table 113 and calculates the capacity of the hard disk drive corresponding to the targeting partition. (step 2002).

The control processor 104 determines the capacities of the respective partitions proportional to the capacity of the hard disk drive used for the respective partitions (step 2003).

The control processor 104 calculates the capacity of the hard disk drive shared among the partitions (step 2004).

Then, the control processor 104 adds extra capacity the respective partitions. The extra capacity is proportional to the capacity of the hard disk drives shared among disk cache partitions (step 2005).

Figure 18:
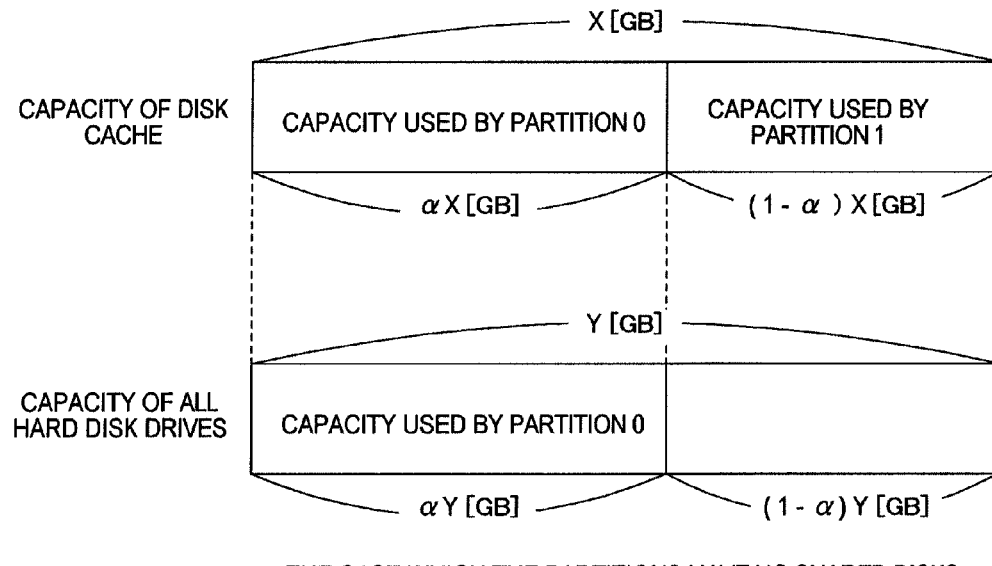
FIG. 18 is a diagram showing the process used to calculate the allocated capacities according to the second embodiment.
Figure 19:
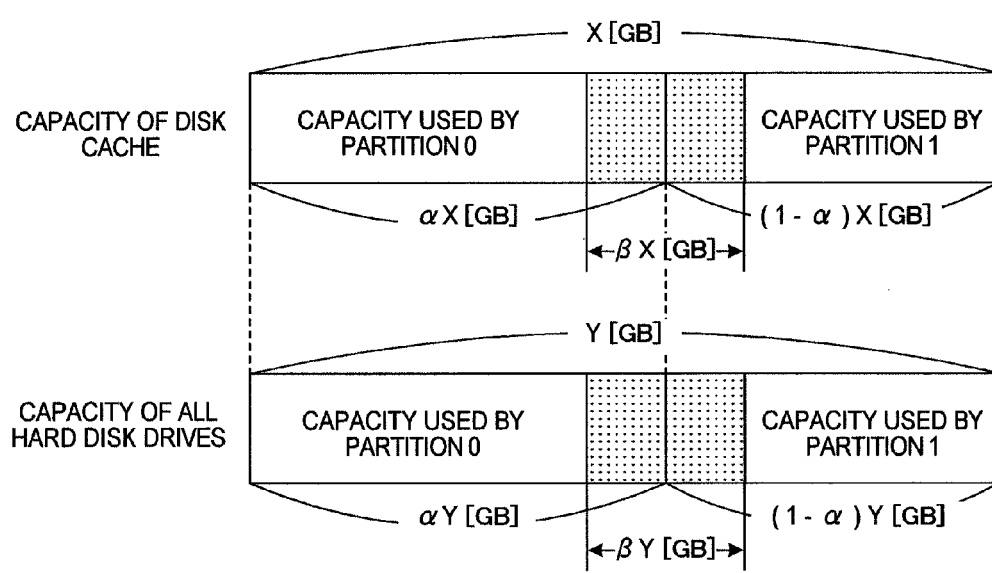
FIG. 19 is a diagram showing the process used to calculate the allocated capacities according to the second embodiment.
Figure 20:
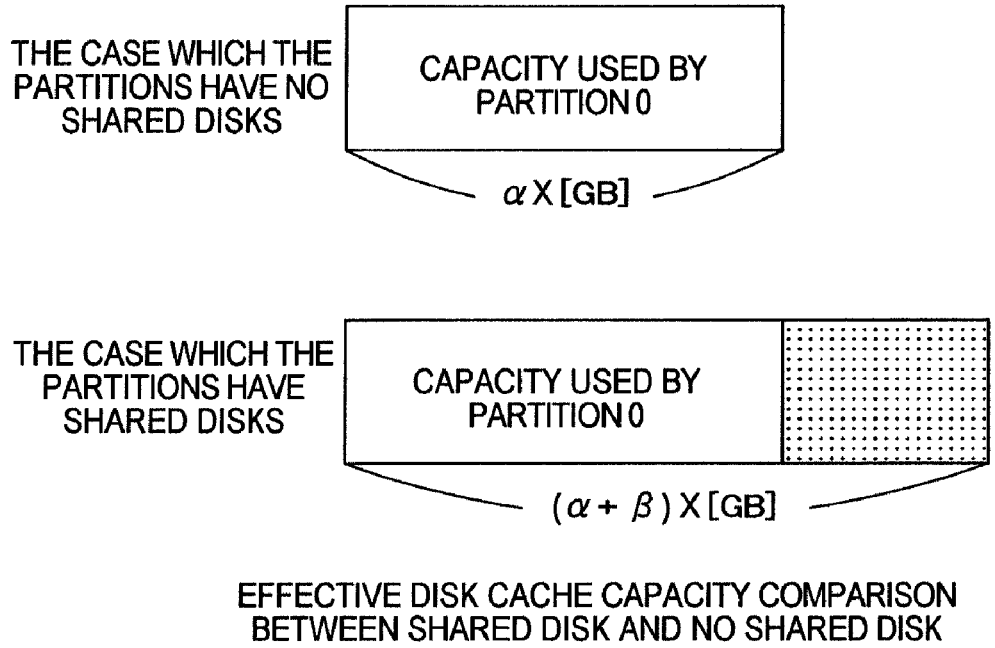
FIG. 20 is a diagram showing the process used to calculate the allocated capacities according to the second embodiment.

FIGS. 18 to 20 show results calculated by the process used to calculate the allocated capacity of the disk cache 106 in FIG. 17.

FIG. 18 shows an allocation of the capacity of the disk cache 106 when the partitions share no capacity of the hard disk drive 107.

When the total capacity of the hard disk is Y (GB), and the ratio of the capacity of the hard disk drive used by the partition 0 and the capacity of the hard disk drives used by the partition 1 is $\alpha:(1-\alpha)$, the capacity of the hard disk drives used by the partition 0 is $\alpha Y$ (GB) and the capacity of the hard disk drives used by the partition 1 is $(1-\alpha)Y$ (GB).

The capacities of the disk cache 106 allocated to the respective partitions are proportional to the capacity of the hard disk drives allocated to the respective disk cache partitions. Thus, the ratio between the capacity of the partition 0 and the capacity of the partition 1 is $\alpha:(1-\alpha)$.

When the total capacity of the disk cache 106 is X (GB), the capacity of the partition 0 is $\alpha X$ (GB), and the capacity the partition 1 is $(1-\alpha)$ X (GB).

FIG. 19 shows an allocation of the capacity of the disk cache 106 when the disk cache partition 0 and 1 share the hard disk drives 107.

When the total capacity of the hard disk is Y (GB), and the ratio of the capacity of the hard disk drive used by the partition 0, the capacity of the hard disk drive used by the partition 1, and the capacity of the hard disk shared among the partitions is $\alpha:(1-\alpha):\beta$, the capacity of the hard disk drive used by the partition 0 is $\alpha Y$ (GB), the capacity of the hard disk drive used by the partition 1 is $(1-\alpha)Y$ (GB), and the capacity of the hard disk shared among the partitions is $\beta Y$ (GB).

The capacity of the respective partitions are proportional to the capacity of the hard disk drives 107 corresponding to the respective partitions. Thus, the ratio between the capacity of the partition 0 and the capacity of the partition 1 is α:(1-α).

When the total capacity of the disk cache 106 is X (GB), the capacity of the disk cache 106 shared among the partitions is βX (GB). When βX (GB) is evenly divided for the respective partitions, the capacity of the partition 0 is (α+β/2)X (GB), and the capacity of the partition 1 is (1-α+β/2)X (GB).

Comparing effective capacity of the shared case with that of unshared case the former is bigger than latter.

As shown in FIG. 20, if the capacity of the hard disk drive is not shared among the partitions, the disk cache capacity used by the partition 0 is αX (GB). On the other hand, if the capacity of the disk is shared among the partitions, the disk cache capacity used by the partition 0 increases to (α+β/2)X (GB).

As described above, the administrator must know in advance the capacity of the hard disk drive 107 shared among the disk cache partitions. When the administrator adopts the policy which sets the ratio of the capacity of the disk cache partitions proportional to the ratio of the capacity of the hard disk drives 107, it is possible to increase the effective capacity of the disk cache partition by the ratio of the shared capacity of the hard disk drive 107.

Moreover, since the effective capacity of the disk cache 106 increases compared with the conventional case, the increased available capacity may be used for the storage system 101. The capability of the storage system 101 has recently increased significantly. For example, there are possible functions to copy data to a remote location, and to duplicate the hard disk drive 107 in a short period in the storage system 101.

The disk cache 106 is a component which has a large influence on the performance. As described above, and an increase in the utilization thereof provides users with a great benefit.

While the present invention has been described in detail and pictorially in the accompanying drawings, the present invention is not limited to such detail but covers various obvious modifications and equivalent arrangements, which fall within the purview of the appended claims.

What is claimed is:

1. A storage system coupled to a first host computer, comprising:
    a non-volatile medium that stores data;
    a disk cache that temporarily stores data stored in the non-volatile medium, where the disk cache is divided into a plurality of independent disk cache partitions;
    a control unit that controls an access to the data stored in the non-volatile medium; and
    a memory unit that stores information used by the control unit, including consistency control information setting read command permitted for each of the disk cache partitions;
    wherein the memory unit stores: a first information including a track information to indicate where the data is stored in the non-volatile medium and segment information to indicate segments where the data corresponding to the track information is stored in the disk cache, in a case where the disk cache temporarily stores the data,
    a second information indicating the number of cache partitions to which each of the segments is allocated, and
    wherein the control unit is configured to determine whether or not to execute the read command for a given disk cache partition, by referring to the consistency control information setting read command permitted for each of the disk cache partitions,
    in a case where data corresponded to the read command is found to exist in a segment which is allocated to first disk cache partition provided to the first host computer, the control unit accesses to the data corresponded to the read command for the found segment;
    in a case where data corresponded to the read command is found to exist in a segment which is not allocated to the first disk cache partition provided to the first host computer and is allocated to a second disk cache partition provided to a second host computer, the control unit co-allocates the found segment to the first disk cache partition without copying the data to the first disk cache partition in order to avoid the data are redundantly stored in both the first disk cache partition and the second disk cache partition, and accesses to the data corresponded to the read command for the found segment.

2. The system as claimed in claim 1, wherein if the read command is not permitted the control unit is configured to report an abnormal end of the read command.

3. The system as claimed in claim 1, wherein the consistency control information is provided via a permission table having entries setting the read command permitted for each of the disk cache partitions.

4. The system as claimed in claim 3, wherein the permission table further having entries setting a hard disk drive (HDD) identifier and a range of tracks in association with the read command permitted for each of the disk cache partitions.

5. The system as claimed in claim 1, wherein the non-volatile medium comprises a plurality of differing hard disk drives (HDD) configured as a single storage in a storage consolidation manner.

6. A disk cache control method for a storage system coupled to a first host computer, comprising:
    storing data in a non-volatile medium;
    temporarily storing data stored in the non-volatile medium in a disk cache, where the disk cache is divided into a plurality of independent disk cache partitions;
    using a control unit to control an access to the data stored in the non-volatile medium;
    storing information used by the control unit in a memory unit, including consistency control information setting read command permitted for each of the disk cache partitions; and
    managing a first information including a track information to indicate where the data is stored in the non-volatile medium and segment information to indicate segments where the data corresponding to the track information is stored in the disk cache, in a case where the disk cache temporarily stores the data,
    managing a second information indicating the number of cache partitions to which each of the segments is allocated, and
    determining whether or not to execute the read command for a given disk cache partition, by referring to the consistency control information setting read command permitted for each of the disk cache partitions,
    in a case where data corresponded to the read command is found to exist in a segment which is allocated to first disk cache partition provided to the first host computer, accessing to the data corresponded to the read command from the found segment;
    in a case where data corresponded to the read command is found to exist in a segment which is not allocated to the first disk cache partition provided to the first host computer and is allocated to a second disk cache partition provided to a second host computer, co-allocating the found segment to the first disk cache partition without copying the data to the first disk cache partition in order to avoid the data are redundantly stored in both the first disk cache partition and the second disk cache partition, and accessing to the data corresponded to the read command for the found segment.

7. The method as claimed in claim 6, wherein if the read command is not permitted, reporting an abnormal end of the read command.

8. The method as claimed in claim 6, wherein the consistency control information is provided via a permission table having entries setting the read command permitted for each of the disk cache partitions.

9. The method as claimed in claim 8, wherein the permission table further having entries setting a hard disk drive (HDD) identifier and a range of tracks in association with the read command permitted for each of the disk cache partitions.

10. The method as claimed in claim 6, wherein the non-volatile medium comprises a plurality of differing hard disk drives (HDD) configured as a single storage in a storage consolidation manner.

11. A storage system coupled to a first host computer, comprising:
a non-volatile medium that stores data;
a disk cache that temporarily stores data stored in the non-volatile medium, where the disk cache is divided into a plurality of independent disk cache partitions;
a control unit that controls an access to the data stored in the non-volatile medium; and
a memory unit that stores information used by the control unit, including consistency control information setting write command permitted for each of the disk cache partitions;
wherein the memory unit stores:
a first information including a track information to indicate where the data is stored in the non-volatile medium and segment information to indicate segments where the data corresponding to the track information is stored in the disk cache, in a case where the disk cache temporarily stores the data,
a second information indicating the number of cache partitions to which each of the segments is allocated, and
wherein the control unit is configured to determine whether or not to execute the write command for a given disk cache partition, by referring to the consistency control information setting write command permitted for each of the disk cache partitions,
in a case where data corresponded to the write command is found to exist in a segment which is allocated to first disk cache partition provided to the first host computer, the control unit accesses to the data corresponded to the write command for the found segment;
in a case where data corresponded to the write command is found to exist in a segment which is not allocated to the first disk cache partition provided to the first host computer and is allocated to a second disk cache partition provided to a second host computer, the control unit co-allocates the found segment to the first disk cache partition without copying the data to the first disk cache partition in order to avoid the data are redundantly stored in both the first disk cache partition and the second disk cache partition, and accesses to the data corresponded to the write command for the found segment.

12. The system as claimed in claim 11, wherein if the write command is not permitted the control unit is configured to resort an abnormal end of the write command.

13. The system as claimed in claim 11, wherein the consistency control information is provided via a permission table having entries setting the write command permitted for each of the disk cache partitions.

14. The system as claimed in claim 13, wherein the permission table further having entries setting a hard disk drive (HDD) identifier and a range of tracks in association with the write command permitted for each of the disk cache partitions.

15. The system as claimed in claim 11, wherein the non-volatile medium comprises a plurality of differing hard disk drives (HOD) configured as a single storage in a storage consolidation manner.

16. A disk cache control method for a storage system coupled to a first host computer, comprising:
storing data in a non-volatile medium;
temporarily storing in the non-volatile medium in a disk cache, where the disk cache is divided into a plurality of independent disk cache partitions;
using a control unit to control an access to the data stored in the non-volatile medium;
storing information used by the control unit in a memory unit, including consistency control information setting write command permitted for each of the disk cache partitions; and
managing a first information including a track information to indicate where the data is stored in the non-volatile medium and segment information to indicate segments where the data corresponding to the track information is stored in the disk cache, in a case where the disk cache temporarily stores data,
managing a second information indicating the number of cache partitions to which each of the segments is allocated, and
determining whether or not to execute the write command for a given disk cache partition by referring to the consistency control information setting write command permitted for each of the disk cache partitions,
in a case where data corresponded to the write command is found to exist in a segment which is allocated to first disk cache partition provided to the first host computer, accessing to the data corresponded to the write command from the found segment;
in a case where data corresponded to the write command is found to exist in a segment which is not allocated to the first disk cache partition provided to the first host computer and is allocated to a second disk cache partition provided to a second host computer, co-allocating the found segment to the first disk cache partition without copying the data to the first disk cache partition in order to avoid the data are redundantly stored in both the first disk cache partition and the second disk cache partition, and accessing to the data corresponded to the write command for the found segment.

17. The method as claimed in claim 16, wherein if the write command is not permitted, reporting an abnormal end of the write command.

18. The method as claimed in claim 16, wherein the consistency contra information is provided via a permission table having entries setting the write command permitted for each of the disk cache partitions.

19. The method as claimed in claim 18, wherein the permission table further having entries setting a hard disk drive (HDD) identifier and a range of tracks in association with the write command permitted for each of the disk cache partitions.

20. The method as claimed in claim 16, wherein the non-volatile medium comprises a plurality of differing hard disk drives (HDD) configured as a single storage in a storage consolidation manner.

* * * * *